(12) United States Patent
Osakada et al.

(10) Patent No.: US 8,044,159 B2
(45) Date of Patent: Oct. 25, 2011

(54) HOMOPOLYMER AND COPOLYMER, AND PRODUCTION PROCESS THEREOF

(75) Inventors: Kohtaro Osakada, Yokohama (JP);
Daisuke Takeuchi, Yokohama (JP);
Sehoon Park, Yokohama (JP);
Masayuki Fujita, Chiba (JP); Wataru Hirahata, Sodegaura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 360 days.

(21) Appl. No.: 12/064,399

(22) PCT Filed: Jun. 28, 2006

(86) PCT No.: PCT/JP2006/313360
§ 371 (c)(1),
(2), (4) Date: Feb. 27, 2009

(87) PCT Pub. No.: WO2007/023618
PCT Pub. Date: Mar. 1, 2007

(65) Prior Publication Data
US 2009/0171054 A1 Jul. 2, 2009

(30) Foreign Application Priority Data

Aug. 26, 2005 (JP) .................. 2005-245511
Aug. 26, 2005 (JP) .................. 2005-245512

(51) Int. Cl.
*C08F 18/14* (2006.01)
(52) U.S. Cl. .................. 526/318.1; 526/318.2; 526/321; 526/323.1
(58) Field of Classification Search ............... 526/318.1, 526/318.2, 321, 323.1
See application file for complete search history.

(56) References Cited

U.S. PATENT DOCUMENTS

| | | | |
|---|---|---|---|
| 5,571,850 A | 11/1996 | Ma et al. | |
| 5,631,345 A | 5/1997 | Takaya et al. | |
| 6,175,047 B1 | 1/2001 | Hori et al. | |
| 6,995,226 B2 | 2/2006 | Taguchi et al. | |
| 2004/0024137 A1 | 2/2004 | Kusudou et al. | |
| 2004/0152843 A1 | 8/2004 | Taguchi et al. | |
| 2008/0214754 A1 | 9/2008 | Osakada et al. | |
| 2008/0214755 A1 | 9/2008 | Osakada et al. | |
| 2008/0214756 A1 | 9/2008 | Osakada et al. | |
| 2008/0221286 A1 | 9/2008 | Osakada et al. | |
| 2008/0221287 A1 | 9/2008 | Osakada et al. | |
| 2008/0221288 A1 | 9/2008 | Osakada et al. | |
| 2008/0234450 A1 | 9/2008 | Osakada et al. | |

FOREIGN PATENT DOCUMENTS

| | | |
|---|---|---|
| JP | 2001-29794 A | 2/2001 |
| JP | 2006-193708 A | 7/2006 |
| WO | 96/23010 A2 | 8/1996 |
| WO | 99/05189 A1 | 2/1999 |
| WO | 2007/023618 A1 | 3/2007 |

OTHER PUBLICATIONS

Gomez et al. Journal of Molecular Catalysis A: Chemical 160 (2000) 145-156.*
STN Search Results, Nov. 17, 2010.*
Pasini et al. Proc. SPIE 1999, 3678, 94-101.*
STN Structure Search, May 13, 2011.*
Laurel A. Goj et al., "Mechanistic Studies of the Cycloisomerization of Dimethy Diallylmalonate Catalyzed by a Cationic Palladium Phenanthroline Complex", J. Am. Chem. Soc., vol. 123, pp. 11133-11147, (2001).
Nicholas S. Perch et al., "Mechanism of Palladium-Catalyzed Diene Cyclization/Hydrosilylation: Direct Observation of Intramolecular Carbometalation", J. Am. Chem., vol. 126, pp. 6332-6346, (2004).
Sehoon Park et al., "Cyclization Polymerization of Diallylmalonates and Copolymerization with Ethylene Catalyzed by Palladium Complexes", Polymer Preprints, Japan, vol. 54, No. 2, pp. 2570 w/attachment, (2005).
Sehoon Park et al., "Pd Complex-Promoted Cyclopolymerization of Functionalized α,ω-Dienes and Copolymerization with Ethylene to Afford Polymers with Cyclic Repeating Units", J. Am. Chem. Soc., vol. 128, pp. 3510-3511, (2006).
Daisuke Takeuchi et al., "Cyclopolymerization of 1,6-Heptadienes Catalyzed by Iron and Cobalt Complexes: Synthesis of Polymers With Trans-or Cis-Fused 1,2-Cyclopentanediyl Groups Depending on the Catalyst", JACS Communications, vol. 129, No. 22, pp. 7002-7003, (2007).
Masayuki Fujita et al. "Synthesis and Characterization of Alternating and Multiblock Copolymers for Ethylene and Cyclopentene", Macromolecules, vol. 35, pp. 9640-9647, (2002).
Takeshi Okada et al.; "Pd-Catalyzed Polymerization of Dienes that Involves Chain-Walking Isomerization of the Growing Polymer End: Synthesis of Polymers Composed of Polymethylene and Five-Membered-Ring Units"; Angew. Chem Int.Ed.; vol. 46; pp. 6141-6143 (2007).
Geoffrey W. Coates et al.; "Chiral polymers via cyclopolymerization"; Journal of Molecular Catalysis; vol. 76; pp. 189-194 (1992).
U.S. Appl. No. 11/959,940, filed Dec. 19, 2007.
U.S. Appl. No. 12/372,815, filed Feb. 18, 2009.
U.S. Office Action issued Sep. 16, 2010 in U.S. Appl. No. 11/946,939.

(Continued)

*Primary Examiner* — David W Wu
*Assistant Examiner* — Vu A Nguyen
(74) *Attorney, Agent, or Firm* — Panitch Schwarze Belisario & Nadel LLP

(57) ABSTRACT

A homopolymer having a monomer unit such as an isopropylidene diallylmalonate unit; a process for producing said homopolymer comprising the step of homopolymerising a monomer such as isopropylidene diallylmalonate; a copolymer containing said monomer unit and an ethylene unit and/or α-olefin unit; and a process for producing said copolymer comprising the step of copolymerizing a monomer such as isopropylidene diallylmalonate with at least ethylene and/or an α-olefin.

10 Claims, No Drawings

OTHER PUBLICATIONS

U.S. Office Action issued Sep. 16, 2010 in U.S. Appl. No. 12/036,230.
U.S. Office Action issued Sep. 16, 2010 in U.S. Appl. No. 11/957,859.
U.S. Office Action issued Sep. 16, 2010 in U.S. Appl. No. 11/958,438.
U.S. Office Action issued Sep. 17, 2010 in U.S. Appl. No. 11/958,905.
U.S. Office Action issued Sep. 16, 2010 in U.S. Appl. No. 12/036,231.
U.S. Office Action dated Sep. 16, 2010 in U.S. Appl. No. 12/036,233.

* cited by examiner

HOMOPOLYMER AND COPOLYMER, AND PRODUCTION PROCESS THEREOF

CROSS-REFERENCE TO RELATED APPLICATION

This application is a section 371 of International Application No. PCT/JP2006/313360, filed Jun. 28, 2006, which was published in the English language on Mar. 1, 2007 under International Publication No. WO 2007/023618 A1 and the disclosure of which is incorporated herein by reference.

TECHNICAL FIELD

The present invention relates to a heat resistant homopolymer or copolymer having a polar group, and a process for producing said homopolymer or copolymer.

BACKGROUND ART

As a superior heat resistance-carrying polymer, JP 2002-363263A (corresponding to US 2004/152843A1) discloses a hydrogenated product of a ring-opened metathesis polymer having hydroxyl groups or hydroxylcarbonyl groups, which polymer is produced by conducting a ring-opening metathesis polymerization of a norbornene-type monomer having hydroxyl groups or hydroxylcarbonyl groups with an unsubstituted norbornene-type monomer having at least three rings in the presence of a catalyst predominantly comprised of an organic ruthenium compound having coordinated therewith a neutral electron-donating ligand, and hydrogenating the resulting copolymer.

However, there are problems in that (1) the above-mentioned hydrogenated product is insufficient in its heat resistance, (2) the above-mentioned production process of said hydrogenated product needs a further step of hydrogenating the ring-opened metathesis polymer, and (3) the above-mentioned production of said ring-opened metathesis polymer needs to use a polymerization catalyst predominantly comprised of an organic ruthenium compound, in order to avoid poisoning of said polymerization catalyst caused by hydroxyl groups or hydroxylcarbonyl groups contained in a norbornene-type monomer.

DISCLOSURE OF INVENTION

In view of the above-mentioned problems in the conventional art, the present invention has an object to provide a heat resistant homopolymer having a polar group, and a process for producing said homopolymer, which does not need such a hydrogenation step as mentioned above, and has an object to provide a heat resistant copolymer having a polar group, and a process for producing said copolymer, which does not need such a hydrogenation step as mentioned above.

The present invention is a homopolymer having a repeating unit represented by the following formula (1):

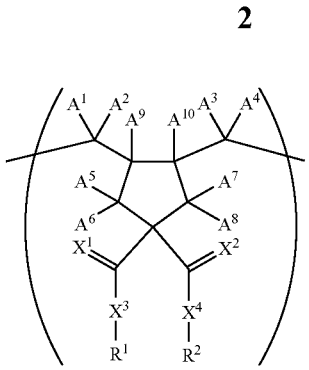

wherein $X^1$, $X^2$, $X^3$ and $X^4$ are independently of one another an atom belonging to group 16 of the periodic table; $R^1$ and $R^2$ are independently of each other a hydrogen atom or a hydrocarbyl group having 1 to 20 carbon atoms, and $R^1$ and $R^2$ may be linked with each other; and $A^1$, $A^2$, $A^3$, $A^4$, $A^5$, $A^6$, $A^7$, $A^8$, $A^9$ and $A^{10}$ are independently of one another a hydrogen atom, a halogen atom, an alkyl group, an aralkyl group, an aryl group, a substituent-having silyl group, an alkoxy group, an aralkyloxy group, an aryloxy group, a disubstituent-having amino group, or a hydrocarbylthio group.

Also, the present invention is a process for producing a homopolymer having a repeating unit represented by the above-mentioned formula (1), which comprises the step of homopolymerizing a compound represented by the following formula (3):

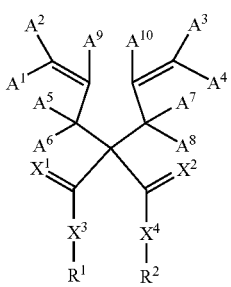

wherein all the symbols contained in the formula (3) are the same as those contained in the formula (1).

Further, the present invention is a copolymer containing a unit represented by the above-mentioned formula (1) and an ethylene unit and/or α-olefin unit.

Still further, the present invention is a process for producing a copolymer containing a unit represented by the above-mentioned formula (1) and an ethylene unit and/or an α-olefin unit, which comprises the step of copolymerizing at least a compound represented by the above-mentioned formula (3) and ethylene and/or an α-olefin.

The above-mentioned homopolymer and copolymer are collectively referred to as "polymer" hereinafter, and the above-mentioned term "unit" means a unit of a homopolymerized or copolymerized monomer.

BEST MODE FOR CARRYING OUT THE INVENTION

Examples of the above-mentioned $X^1$, $X^2$, $X^3$ and $X^4$ in those formulas are an oxygen atom, a sulfur atom and a selenium atom.

Examples of the above-mentioned hydrocarbyl group having 1 to 20 carbon atoms of $R^1$ and $R^2$ are a linear alkyl group such as a methyl group, an ethyl group, and a n-butyl group; a branched alkyl group such as isopropyl group, an isobutyl group, a tert-butyl group, and a neopentyl group; and a cyclic alkyl group such as a cyclohexyl group and a cyclooctyl group. $R^1$ and $R^2$ are preferably an alkyl group having 1 to 20 carbon atoms, more preferably a non-substituent-having linear alkyl group having 1 to 10 carbon atoms, and further preferably a methyl group, an ethyl group, or a n-butyl group.

When the above-mentioned $R^1$ and $R^2$ are linked with each other, examples of a ring formed by said linkage are an aliphatic ring and an aromatic ring. Those rings may have one or more substituents. Examples of a divalent group, which is formed by said linkage and is a part of an aliphatic ring, are a methylene group, an isopropylidene group, a 1,2-ethylene group, a 1,2-cyclohexylene group, a 1,3-cyclohexylene group, a 1,4-cyclohexylene group, a 1,2-norbornene group, a 2,3-butene group, a 2,3-dimethyl-2,3-butene group, and a 2,4-pentene group. Among them, preferred is a methylene group, an isopropylidene group, a 2,3-butene group, or a 2,3-dimethyl-2,3-butene group. Examples of a divalent group, which is formed by said linkage and is a part of an aromatic ring, are a 1,2-phenylene group, a 1,3-phenylene group, a 1,4-phenylene group, a 1,2-naphthylene group, a 1,3-naphthylene group, a 1,4-naphthylene group, a 1,5-naphthylene group, a 1,6-naphthylene group, a 1,7-naphthylene group, a 1,8-naphthylene group, a 2,3-naphthylene group, a 2,4-naphthylene group, a 2,5-naphthylene group, a 2,6-naphthylene group, a 2,7-naphthylene group, a 2,8-naphthylene group, a 2,2'-biphenylene group, a 1,2-dimethylenephenyl group, a 1,3-dimethylenephenyl group, a 1,4-dimethylenephenyl group, a 1,2-diethylenephenyl group, a 1,3-diethylenephenyl group, and a 1,4-diethylenephenyl group.

Examples of the above-mentioned halogen atom of $A^1$, $A^2$, $A^3$, $A^4$, $A^5$, $A^6$, $A^7$, $A^8$, $A^9$ and $A^{10}$ are a fluorine atom, a chlorine atom, a bromine atom, and an iodine atom. Among them, preferred is a fluorine atom.

Examples of the above-mentioned alkyl group of $A^1$, $A^2$, $A^3$, $A^4$, $A^5$, $A^6$, $A^7$, $A^8$, $A^9$ and $A^{10}$ are a linear alkyl group such as a methyl group, an ethyl group, and a n-butyl group; a branched alkyl group such as isopropyl group, an isobutyl group, a tert-butyl group, and a neopentyl group; and a cyclic alkyl group such as a cyclohexyl group and a cyclooctyl group.

Examples of the above-mentioned aralkyl group of $A^1$, $A^2$, $A^3$, $A^4$, $A^5$, $A^6$, $A^7$, $A^8$, $A^9$ and $A^{10}$ are a benzyl group, a phenethyl group, a 2-methylbenzyl group, a 3-methylbenzyl group, a 4-methylbenzyl group, a 2,6-dimethylbenzyl group, and a 3,5-dimethylbenzyl group. Said aralkyl group may have a substituent such as a halogen atom, a hydrocarbyloxy group, a nitro group, a sulfonic group, a silyl group, and a cyano group.

Examples of the above-mentioned aryl group of $A^1$, $A^2$, $A^3$, $A^4$, $A^5$, $A^6$, $A^7$, $A^8$, $A^9$ and $A^{10}$ are a phenyl group, a tolyl group, and a mesityl group. Said aryl group may have a substituent such as a halogen atom, a hydrocarbyloxy group, a nitro group, a sulfonic group, a silyl group, and a cyano group.

Examples of the above-mentioned substituent-having silyl group of $A^1$, $A^2$, $A^3$, $A^4$, $A^5$, $A^6$, $A^7$, $A^8$, $A^9$ and $A^{10}$ are a trimethylsilyl group, a diethylmethylsilyl group, an ethyldimethylsilyl group, and a triethylsilyl group. Said substituent-having silyl group may have a substituent such as a halogen atom, a hydrocarbyloxy group, a nitro group, a sulfonic group, a silyl group, and a cyano group.

Examples of the above-mentioned alkoxy group of $A^1$, $A^2$, $A^3$, $A^4$, $A^5$, $A^6$, $A^7$, $A^8$, $A^9$ and $A^{10}$ are a linear alkoxy group such as a methoxy group, an ethoxy group, and a n-butoxy group; a branched alkoxy group such as an isopropoxy group, an isobutoxy group, a tert-butoxy group, and a neopentoxy group; and a cyclic alkoxy group such as a cyclohexyloxy group and a cyclooctyloxy group. Said alkoxy group may have a substituent such as a halogen atom, a hydrocarbyloxy group, a nitro group, a sulfonic group, a silyl group, and a cyano group.

Examples of the above-mentioned aralkyloxy group of $A^1$, $A^2$, $A^3$, $A^4$, $A^5$, $A^6$, $A^7$, $A^8$, $A^9$ and $A^{10}$ are a benzyloxy group, a phenethyloxy group, a 2-methylbenzyloxy group, a 3-methylbenzyloxy group, a 4-methylbenzyloxy group, a 2,6-dimethylbenzyloxy group, and a 3,5-dimethylbenzyloxy group. Said aralkyloxy group may have a substituent such as a halogen atom, a hydrocarbyloxy group, a nitro group, a sulfonic group, a silyl group, and a cyano group.

Examples of the above-mentioned aryloxy group of $A^1$, $A^2$, $A^3$, $A^4$, $A^5$, $A^6$, $A^7$, $A^8$, $A^9$ and $A^{10}$ are a phenoxy group, a 2-methylphenoxy group, a 2-ethylphenoxy group, a 2-n-propylphenoxy group, a 2-isopropylphenoxy group, a 2-n-butylphenoxy group, a 2-isobutylphenoxy group, a 2-tert-butylphenoxy group, a 3-methylphenoxy group, a 3-isopropylphenoxy group, a 3-n-butylphenoxy group, a 3-tert-butylphenoxy group, a 4-methylphenoxy group, a 4-isopropylphenoxy group, a 4-n-butylphenoxy group, a 4-tert-butylphenoxy group, a 2,3-dimethylphenoxy group, a 2,4-dimethylphenoxy group, a 2,5-dimethylphenoxy group, a 2,6-dimethylphenoxy group, a 3,5-dimethylphenoxy group, a 2,6-diisopropylphenoxy group, a 2,6-di-tert-butylphenoxy group, and a naphthoxy group. Said aryloxy group may have a substituent such as a halogen atom, a hydrocarbyloxy group, a nitro group, a sulfonic group, a silyl group, and a cyano group.

Examples of the above-mentioned disubstituent-having amino group of $A^1$, $A^2$, $A^3$, $A^4$, $A^5$, $A^6$, $A^7$, $A^8$, $A^9$ and $A^{10}$ linear alkylamino group such as an N,N-dimethylamino group, an N,N-diethylamino group, and an N,N-di-n-butylamino group; a branched alkylamino group such as an N,N-diisopropylamino group, an N,N-diisobutylamino group, an N,N-di-tert-butylamino group, and an N,N-dineopentylamino group; and a cyclic alkylamino group such as an N,N-dicyclohexylamino group and an N,N-dicyclooctylamino group.

Examples of the above-mentioned hydrocarbylthio group of $A^1$, $A^2$, $A^3$, $A^4$, $A^5$, $A^6$, $A^7$, $A^8$, $A^9$ and $A^{10}$ are a linear alkylthio group such a methylthio group, an ethylthio group, and a n-butylthio group; a branched alkylthio group such as an isopropylthio group, an isobutylthio group, a tert-butylthio group, and a neopentylthio group; and a cyclic alkylthio group such as a cyclohexylthio group and a cyclooctylthio group.

Among them, $A^1$, $A^2$, $A^3$, $A^4$, $A^5$, $A^6$, $A^7$, $A^8$, $A^9$ and $A^{10}$ are preferably a hydrogen atom, a halogen atom, or an alkyl group having 1 to 10 carbon atoms, more preferably a hydrogen atom or a methyl group, and further preferably a hydrogen atom.

$A^5$ and $A^6$ and/or $A^7$ and $A^8$ may be linked with each other, respectively. Examples of a ring formed by said linkage are an aliphatic ring such as a cyclobutane ring, a cyclopentane ring and a cyclohexane ring; and an aromatic ring. These rings may have one or more substituents.

The above-mentioned repeating unit represented by the formula (1) is not particularly limited in its configuration between the main chain of the polymer and the five-membered ring having the substituents such as $A^5$, $A^6$, $A^7$, $A^8$, $A^9$ and $A^{10}$. Its configuration is preferably a trans-form; namely, the five-membered ring has preferably a trans-form for the main chain represented by the formula (2),

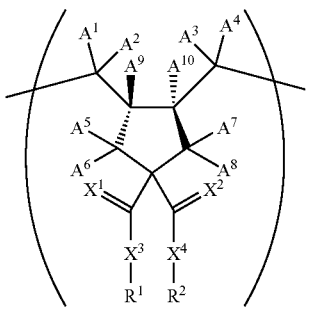

(2)

in order to produce a heat resistant polymer.

In the present invention, the above-mentioned configuration is determined with a $^{13}$C-NMR spectrum obtained by use of a solution of the polymer in chloroform-$d_1$. A peak (i) appearing at 45 to 46 ppm in the $^{13}$C-NMR spectrum is assigned to carbon atoms having a trans-form configuration, and a peak (ii) appearing at 39 to 42 ppm therein is assigned to carbon atoms having a cis-form configuration, provided that a peak assigned to chloroform-$d_1$ appears at 77 ppm.

Therefore, a proportion (%) of the above-mentioned trans-form is derived form the following formula:

Proportion(%)of trans-form=area of peak(*i*)×100/[area of peak(*i*)+area of peak(*ii*)].

Stereoregularity of the homopolymer of the present invention is determined by an absolute configuration of the two asymmetric carbon atoms, which are linked to $A^9$ and $A^{10}$, respectively, and exist in the main chain of the homopolymer having the repeating unit represented by the formula (1). There are four kinds of homopolymers in view of said stereoregularity, (a) an erythrodiisotactic homopolymer, (b) an erythrodisyndiotactic homopolymer, (c) a threodiisotactic homopolymer, and (d) a threodisyndiotactic homopolymer, as shown in the following formulas:

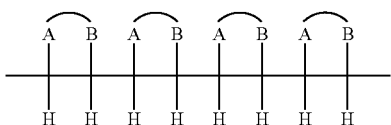

(a) Erythrodiisotactic Homopolymer

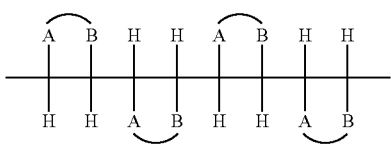

(b) Erythrodisyndiotactic Homopolymer

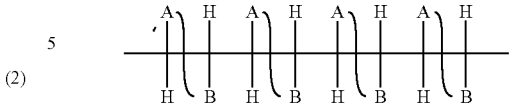

(c) Threodiisotactic Homopolymer

(d) Threodisyndiotactic Homopolymer wherein A, B and a curved line linking them with each other represent a total cyclic structure from the carbon atom linking with $A^5$ and $A^6$ in the repeating unit represented by the formula (1) to the carbon atom linking with $A^7$ and $A^8$ therein; H represents a case wherein both A9 and A10 in the repeating unit represented by the formula (1) are a hydrogen atom; and the two carbon atoms linking with $A^1$ and $A^2$ and with $A^3$ and $A^4$, respectively, in the repeating unit represented by the formula (1) are abbreviated.

The above-mentioned four kinds of homopolymers are defined in Encyclopedia of polymer Science and Engineering 2nd Ed., John Wiley & Sons, New York, 1987, Vol. 10, pages 191-203.

Although stereoregularity of the homopolymer of the present invention is not particularly limited, preferred is (i) a diisotactic homopolymer having more than 25% of an erythrodiisotactic triad or a threodiisotactic triad, or (ii) a disyndiotactic homopolymer having more than 25% of an erythrodisyndiotactic triad or a threodisyndiotactic triad, in order to produce a homopolymer excellent in its heat resistance.

The above-mentioned diisotactic homopolymer is more preferably a homopolymer having 30% or more of a diisotactic triad, and further preferably a homopolymer having 50% or more thereof. The above-mentioned disyndiotactic homopolymer is more preferably a homopolymer having 30% or more of a disyndiotactic triad, and further preferably a homopolymer having 50% or more thereof.

The above-mentioned stereoregularity is determined with a $^{13}$C-NMR spectrum obtained by use of a solution of the homopolymer of the present invention in chloroform-$d_1$. A peak (iii) appearing at 46.2 to 46.6 ppm in the $^{13}$C-NMR spectrum is assigned to carbon atoms derived from a threodiisotactic triad, and a peak (iv) appearing at 46.9 to 47.3 ppm therein is assigned to carbon atoms derived from a threodisyndiotactic triad, provided that a peak assigned to chloroform-$d_1$ appears at 77 ppm.

Therefore, a proportion (%) of the above-mentioned threodiisotactic triad is derived form the following formula:

Proportion(%)of threodiisotactic triad=area of peak (*iii*)×100/[area of peak(*iii*)+area of peak(*iv*)]; and a proportion (%) of the above-mentioned threodisyndiotactic triad is derived form the following formula:

Proportion(%)of threodisyndiotactic triad=area of peak(*iv*)×100/[area of peak(*iii*)+area of peak(*iv*)].

Examples of the compound represented by the formula (3) are diallyldicarboxylic acid esters. Among them, particularly preferred is isopropylidene diallylmalonate, dimethyl diallylmalonate, diethyl diallylmalonate, diisopropyl diallylmalonate, or di-tert-butyl diallylmalonate, all of which are known in the art. Each of dipropyl diallylmalonate and dicyclohexyl diallylmalonate can be obtained according to a method such as that shown in the below-mentioned Example.

The α-olefin in the present invention means a 1-alkene having a carbon-carbon double bond at its α-position. Examples of the α-olefin are a linear α-olefin such as propylene, 1-butene, 1-pentene, 1-hexene, 1-heptene, 1-octene, 1-nonene and 1-decene; and a branched α-olefin such as 3-methyl-1-butene, 3-methyl-1-pentene, 4-methyl-1-pentene and vinylcyclohexane. Among them, preferred is an α-olefin having 3 to 20 carbon atoms, further preferred is a linerar α-olefin having 3 to 10 carbon atoms, and particularly preferred is propylene, 1-butene, 1-pentene, 1-hexene or 1-octene.

The homopolymer of the present invention can be produced by homopolymerizing the compound represented by the formula (3) in the presence of a catalyst formed by contacting a transition metal compound with an organic aluminum compound and/or boron compound.

Also, the copolymer of the present invention can be produced by copolymerizing at least the compound represented by the formula (3) with ethylene and/or the above-mentioned α-olefin in the presence of said catalyst.

The transition metal compound is not particularly limited as long as it has an activity for an addition polymerization, and may be a compound known in the art. Among them, preferred is a transition metal compound having a transition metal belonging to groups 4 to 10 or lanthanide series of the periodic table. Examples of the transition metal compound are that represented by the following formula (4), and a 9-oxo transition metal compound, which is a dimmer obtained by reacting said transition metal compound with water:

$$L_a M^1 X_b \qquad (4)$$

wherein $M^1$ is a transition metal atom belonging to groups 4 to 10 or lanthanide series of the periodic table (IUPAC 1985); L is a cyclopentadiene-containing anionic group or a hetero atom-having group, and when plural Ls exist, they may be linked with one another directly or through a group having a carbon atom, a silicon atom, a nitrogen atom, an oxygen atom, a sulfur atom or a phosphor atom; X is a halogen atom or a hydrocarbyl group having 1 to 20 carbon atoms; a is a number satisfying $0<a\leqq 8$; and b is a number satisfying $0<a\leqq 8$.

Examples of $M^1$ are a titanium atom, a zirconium atom, a hafnium atom, a vanadium atom, a niobium atom, a tantalum atom, a chromium atom, an iron atom, a ruthenium atom, a cobalt atom, a rhodium atom, a nickel atom, a palladium atom, a samarium atom, and an ytterbium atom.

Examples of the above-mentioned cyclopentadiene-containing anionic group of L are a cyclopentadienyl group, a substituent-having cyclopentadienyl group, an indenyl group, a substituent-having indenyl group, a fluorenyl group, and a substituent-having fluorenyl group.

Specific examples of the cyclopentadiene-containing anionic group are an $\eta^5$-cyclopentadienyl group, an $\eta^5$-methylcyclopentadienyl group, an $\eta^5$-tert-butylcyclopentadienyl group, an $\eta^5$-1,2-dimethylcyclopentadienyl group, an $\eta^5$-1,3-dimethylcyclopentadienyl group, an $\eta^5$-1-tert-butyl-2-methylcyclopentadienyl group, an $\eta^5$-1-tert-butyl-3-methylcyclopentadienyl group, an $\eta^5$-1-methyl-2-isopropylcyclopentadienyl group, an $\eta^5$-1-methyl-3-isopropylcyclopentadienyl group, an $\eta^5$-1,2,3-trimethylcyclopentadienyl group, an $\eta^5$-1,2,4-trimethylcyclopentadienyl group, an $\eta^5$-tetramethylcyclopentadienyl group, an $\eta^5$-pentamethylcyclopentadienyl group, an $\eta^5$-indenyl group, an $\eta^5$-4,5,6,7-tetrahydroindenyl group, an $\eta^5$-2-methylindenyl group, an $\eta^5$-3-methylindenyl group, an $\eta^5$-4-methylindenyl group, an $\eta^5$-5-methylindenyl group, an $\eta^5$-6-methylindenyl group, an $\eta^5$-7-methylindenyl group, an $\eta^5$-2-tert-butylindenyl group, an $\eta^5$-3-tert-butylindenyl group, an $\eta^5$-4-tert-butylindenyl group, an $\eta^5$-5-tert-butylindenyl group, an $\eta^5$-6-tert-butylindenyl group, an $\eta^5$-7-tert-butylindenyl group, an $\eta^5$-2,3-dimethylindenyl group, an $\eta^5$-4,7-dimethylindenyl group, an $\eta^5$-2,4,7-trimethylindenyl group, an $\eta^5$-2-methyl-4-isopropylindenyl group, an $\eta^5$-4,5-benzindenyl group, an $\eta^5$-2-methyl-4,5-benzindenyl group, an $\eta^5$-4-phenylindenyl group, an $\eta^5$-2-methyl-5-phenylindenyl group, an $\eta^5$-2-methyl-4-phenylindenyl group, an $\eta^5$-2-methyl-4-naphthylindenyl group, an $\eta^5$-fluorenyl group, an $\eta^5$-2,7-dimethylfluorenyl group, and an $\eta^5$-2,7-di-tert-butylfluorenyl group.

Examples of the hetero atom in the above-mentioned hetero atom-having group of L are an oxygen atom, a sulfur atom, a nitrogen atom, and a phosphorus atom. Examples of the hetero atom-having group are an alkoxy group; an aryloxy group; a thioalkoxy group; a thioaryloxy group; an alkylamino group; an arylamino group; an alkylphosphino group; an arylphosphino group; an aromatic or aliphatic heterocyclic group containing in its ring at least one atom selected from the group consisting of an oxygen atom, a sulfur atom, a nitrogen atom and a phosphorus atom; and a chelating ligand.

Examples of the hetero atom-having group are an alkoxy group such as a methoxy group, an ethoxy group, a propoxy group, and a butoxy group; an aryloxy group such as a phenoxy group, a 2-methylphenoxy group, a 2,6-dimethylphenoxy group, a 2,4,6-trimethylphenoxy group, a 2-ethylphenoxy group, a 4-n-propylphenoxy group, a 2-isopropylphenoxy group, a 2,6-diisopropylphenoxy group, a 4-sec-butylphenoxy group, a 4-tert-butylphenoxy group, a 2,6-di-sec-butylphenoxy group, a 2-tert-butyl-4-methylphenoxy group, and a 2,6-di-tert-butylphenoxy group; a substituent-having aryloxy group such as a 4-methoxyphenoxy group, a 2,6-dimethoxyphenoxy group, a 3,5-dimethoxyphenoxy group, a 2-chlorophenoxy group, a 4-nitrosophenoxy group, a 4-nitrophenoxy group, a 2-aminophenoxy group, a 3-aminophenoxy group, a 4-aminothiophenoxy group, a 2,3,6-trichlorophenoxy group, and a 2,4,6-trifluorophenoxy group; a thioalkoxy group such as a thiomethoxy group; an alkylamino group such as a dimethylamino group, a diethylamino group, a dipropylamino group, an isopropylamino group, and a tert-butylamino group; an arylamino group such as a diphenylamino group; a pyrrolyl group; a phosphino group such as a dimethylphosphino group; and a aryldioxy group such as a 2-(2-oxy-1-propyl)phenoxy group, a catecholato group, a resorcinolate group, a 4-isopropylcatecholato group, a 3-methoxycatecholato group, a 1,8-dihydroxynahpthyl group, a 1,2-dihydroxynahpthyl group, a 2,2'-biphenyldiol group, a 1,1'-bi-2-naphthol group, a 2,2'-dihydroxy-6,6'-dimethylbiphenyl group, a 4,4',6,6'-tetra-tert-butyl-2,2'-methylenediphenoxy group, and a 4,4',6,6'-tetramethyl-2,2'-isobutylidenediphenoxy group.

The chelating ligand mentioned above in the examples of the hetero atom-having group means a ligand having plural coordinating positions. Examples thereof are acetylacetonate, diimine, oxazoline, bisoxazoline, terpyridine, acylhydrazone, diethylenetriamine, triethylenetetramine, porphyrin, crown ether and cryptate.

As mentioned above, when plural Ls exist, they may be linked (namely, plural cyclopentadiene-containing anionic groups are linked; plural hetero atom-having groups are linked; or the cyclopentadiene-containing anionic group and the hetero atom-having group are linked) with one another directly or through a group having a carbon atom, a silicon atom, a nitrogen atom, an oxygen atom, a sulfur atom or a phosphor atom. Examples of the group having a carbon atom, a silicon atom, a nitrogen atom, an oxygen atom, a sulfur atom or a phosphor atom are an alkylene group such as an ethylene group and a propylene group; a substituent-having alkylene group such as a dimethylmethylene group (an isopropylidene group) and a diphenylmethylene group; a silylene group; a substituent having silylene group such as a dimethylsilylene group, a diphenylsilylene group, and a tetramethyldisilylene group; and a hetero-atom such as a nitrogen atom, an oxygen atom, a sulfur atom and a phosphorus atom.

Examples of the halogen atom of X in the formula (4) are a fluorine atom, a chlorine atom, a bromine atom and an iodine atom, and examples of the hydrocarbyl group having 1 to 20 carbon atoms of X therein are a methyl group, an ethyl group, a n-propyl group, an isopropyl group, a n-butyl group, a phenyl group, and a benzyl group.

Each number of "a" and "b" in the formula (4) is determined such that the charge of the transition metal compound represented by the formula (4) is neutral, taking account of each valence of $M^1$, L and X.

Examples of the transition metal compound represented by the formula (4), wherein $M^1$ is a titanium atom, are bis(cyclopentadienyl)titanium dichloride, bis(methylcyclopentadienyl)titanium dichloride, bis(n-butylcyclopentadienyl)titanium dichloride, bis(dimethylcyclopentadienyl)titanium dichloride, bis(ethylmethylcyclopentadienyl)titanium dichloride, bis(trimethylcyclopentadienyl)titanium dichloride, bis(tetramethylcyclopentadienyl)titanium dichloride, bis(pentamethylcyclopentadienyl)titanium dichloride, bis(indenyl)titanium dichloride, bis(4,5,6,7-tetrahydroindenyl)titanium dichloride, bis(fluorenyl)titanium dichloride, cyclopentadienyl(pentamethylcyclopentadienyl)titanium dichloride, cyclopentadienyl(indenyl)titanium dichloride, cyclopentadienyl(fluorenyl)titanium dichloride, indenyl(fluorenyl)titanium dichloride, pentamethylcyclopentadienyl (indenyl)titanium dichloride, pentamethylcyclopentadienyl (fluorenyl)titanium dichloride, ethylenebis(cyclopentadienyl)titanium dichloride, ethylenebis(2-methylcyclopentadienyl)titanium dichloride, ethylenebis(3-methylcyclopentadienyl)titanium dichloride, ethylenebis(2-n-butylcyclopentadienyl)titanium dichloride, ethylenebis(3-n-butylcyclopentadienyl)titanium dichloride, ethylenebis(2,3-dimethylcyclopentadienyl)titanium dichloride, ethylenebis(2,4-dimethylcyclopentadienyl)titanium dichloride, ethylenebis(2,5-dimethylcyclopentadienyl)titanium dichloride, ethylenebis(3,4-dimethylcyclopentadienyl)titanium dichloride, ethylenebis(2,3-ethylmethylcyclopentadienyl)titanium dichloride, ethylenebis(2,4-ethylmethylcyclopentadienyl)titanium dichloride, ethylenebis(2,5-ethylmethylcyclopentadienyl)titanium dichloride, ethylenebis(3,5-ethylmethylcyclopentadienyl)titanium dichloride, ethylenebis(2,3,4-trimethylcyclopentadienyl)titanium dichloride, ethylenebis(2,3,5-trimethylcyclopentadienyl)titanium dichloride, ethylenebis(tetramethylcyclopentadienyl)titanium dichloride, ethylenebis(indenyl)titanium dichloride, ethylenebis(4,5,6,7-tetrahydroindenyl)titanium dichloride, ethylenebis(2-phenylindenyl)titanium dichloride, ethylenebis(2-methylindenyl)titanium dichloride, ethylenebis(2-methyl-4-phenylindenyl)titanium dichloride, ethylenebis(2-methyl-4-naphthylindenyl)titanium dichloride, ethylenebis(2-methyl-4,5-benzoindenyl)titanium dichloride, ethylenebis(fluorenyl)titanium dichloride, ethylene(cyclopentadienyl)(pentamethylcyclopentadienyl)titanium dichloride, ethylene(cyclopentadienyl)(indenyl)titanium dichloride, ethylene(methylcyclopentadienyl) (indenyl)titanium dichloride, ethylene(n-butylcyclopentadienyl)(indenyl)titanium dichloride, ethylene(tetramethylcyclopentadienyl) (indenyl)titanium dichloride, ethylene(cyclopentadienyl)(fluorenyl)titanium dichloride, ethylene(methylcyclopentadienyl)(fluorenyl)titanium dichloride, ethylene (pentamethylcyclopentadienyl)(fluorenyl)titanium dichloride, ethylene(n-butylcyclopentadienyl) (fluorenyl)titanium dichloride, ethylene (tetramethylpentadienyl)(fluorenyl)titanium dichloride, ethylene(indenyl)(fluorenyl)titanium dichloride, isopropylidenebis(cyclopentadienyl)titanium dichloride, isopropylidenebis(2-methylcyclopentadienyl)titanium dichloride, isopropylidenebis(3-methylcyclopentadienyl)titanium dichloride, isopropylidenebis(2-n-butylcyclopentadienyl)titanium dichloride, isopropylidenebis(3-n-butylcyclopentadienyl)titanium dichloride, isopropylidenebis(2,3-dimethylcyclopentadienyl)titanium dichloride, isopropylidenebis(2,4-dimethylcyclopentadienyl)titanium dichloride, isopropylidenebis(2,5-dimethylcyclopentadienyl) titanium dichloride, isopropylidenebis(3,4-dimethylcyclopentadienyl)titanium dichloride, isopropylidenebis(2,3-ethylmethylcyclopentadienyl)titanium dichloride, isopropylidenebis (2,4-ethylmethylcyclopentadienyl)titanium dichloride, isopropylidenebis(2,5-ethylmethylcyclopentadienyl)titanium dichloride, isopropylidenebis(3,5-ethylmethylcyclopentadienyl)titanium dichloride, isopropylidenebis(2,3,4-trimethylcyclopentadienyl)titanium dichloride, isopropylidenebis(2,3,5-trimethylcyclopentadienyl)titanium dichloride, isopropylidenebis(tetramethylcyclopentadienyl) titanium dichloride, isopropylidenebis(indenyl)titanium dichloride, isopropylidenebis(4,5,6,7-tetrahydroindenyl)titanium dichloride, isopropylidenebis(2-phenylindenyl)titanium dichloride, isopropylidenebis(2-methylindenyl)titanium dichloride, isopropylidenebis(2-methyl-4-phenylindenyl)titanium dichloride, isopropylidenebis(2-methyl-4-naphthylindenyl)titanium dichloride, isopropylidenebis(2-methyl-4,5-benzoindenyl)titanium dichloride, isopropylidenebis(fluorenyl)titanium dichloride, isopropylidene(cyclopentadienyl) (tetramethylcyclopentadienyl)titanium dichloride, isopropylidene(cyclopentadienyl)(indenyl)titanium dichloride, isopropylidene(methylcyclopentadienyl)(indenyl)titanium dichloride, isopropylidene(n-butylcyclopentadienyl)(indenyl)titanium dichloride, isopropylidene(tetramethylcyclopentadienyl)(indenyl)titanium dichloride, isopropylidene (cyclopentadienyl)(fluorenyl)titanium dichloride, isopropylidene(methylcyclopentadienyl)(fluorenyl)titanium dichloride, isopropylidene(n-butylcyclopentadienyl)(fluorenyl)titanium dichloride, isopropylidene(tetramethylcyclopentadienyl)(fluorenyl)titanium dichloride, isopropylidene (indenyl)(fluorenyl)titanium dichloride, dimethylsilylenebis(cyclopentadienyl)titanium dichloride, dimethylsilylenebis(2-methylcyclopentadienyl) titanium dichloride, dimethylsilylenebis(3-methylcyclopentadienyl)titanium dichloride, dimethylsilylenebis(2-n-butylcyclopentadienyl)titanium dichloride, dimethylsilylenebis (3-n-butylcyclopentadienyl)titanium dichloride, dimethylsilylenebis(2,3-dimethylcyclopentadienyl)titanium dichloride, dimethylsilylenebis(2,4-dimethylcyclopentadienyl)titanium dichloride, dimethylsilylenebis(2,5-dimethylcyclopentadienyl)titanium dichloride, dimethylsilylenebis(3,4-dimethylcyclopentadienyl)titanium dichloride, dimethylsilylenebis(2,3-ethylmethylcyclopentadienyl)titanium dichloride, dimethylsilylenebis(2,4-ethylmethylcyclopentadienyl)titanium dichloride, dimethylsilylenebis(2,5-ethylmethylcyclopentadienyl)titanium dichloride, dimethylsilylenebis(3,5-ethylmethylcyclopentadienyl)titanium dichloride, dimethylsilylenebis(2,3,4-trimethylcyclopentadienyl)titanium dichloride, dimethylsilylenebis(2,3,5-trimethylcyclopentadienyl)titanium dichloride, dimethylsilylenebis(tetramethylcyclopentadienyl)titanium dichloride, dimethylsilylenebis(indenyl)titanium dichloride, dimethylsilylenebis(4,5,6,7-tetrahydroindenyl)titanium dichloride, dimethylsilylenebis(2-phenylindenyl)titanium dichloride, dimethylsilylenebis(2-methylindenyl)titanium dichloride, dimethylsilylenebis(2-methyl-4-phenylindenyl) titanium dichloride, dimethylsilylenebis(2-methyl-4-naphthylindenyl) titanium dichloride, dimethylsilylenebis(2-methyl-4,5-benzoindenyl) titanium dichloride, dimethylsilylene (cyclopentadienyl)(indenyl)titanium dichloride, dimethylsilylene(methylcyclopentadienyl)(indenyl)titanium dichloride, dimethylsilylene(n-butylcyclopentadienyl)(indenyl)titanium dichloride, dimethylsilylene(tetramethylcyclopentadienyl)(indenyl)titanium dichloride, dimethylsilylene (cyclopentadienyl)(fluorenyl)titanium dichloride, dimethylsilylene(methylcyclopentadienyl)(fluorenyl)titanium dichloride, dimethylsilylene(n-butylcyclopentadienyl) (fluorenyl)titanium dichloride, dimethylsilylene(tetramethylcyclopentadienyl)(indenyl)titanium dichloride, dimethylsilylene(indenyl)(fluorenyl)titanium dichloride, cyclopentadienyllitanium trichloride, pentamethylcyclopentadienyltitanium trichloride, cyclopentadienyl(dimethylamido)titanium dichloride, cyclopentadienyl(phenoxy)titanium dichloride, cyclopentadienyl(2,6-dimethylphenyl)titanium dichloride, cyclopentadienyl(2,6-diisopropylphenyl)titanium dichloride, cyclopentadienyl(2,6-di-tert-butylphenyl) titanium dichloride, pentamethylcyclopentadienyl(2,6-dimethylphenyl)titanium dichloride, pentamethylcyclopentadienyl(2,6-diisopropylphenyl)titanium dichloride, pentamethylcyclopentadienyl(2,6-di-tert-butylphenyl)titanium dichloride, indenyl(2,6-diisopropylphenyl)titanium dichloride, fluorenyl (2,6-diisopropylphenyl)titanium dichloride, methylene (cyclopentadienyl)(3,5-dimethyl-2-phenoxy)titanium dichloride, methylene(cyclopentadienyl)(3-tert-butyl-2-phenoxy)titanium dichloride, methylene(cyclopentadienyl)(3-tert-butyl-5-methyl-2-phenoxy)titanium dichloride, methylene(cyclopentadienyl)(3-phenyl-2-phenoxy)titanium dichloride, methylene(cyclopentadienyl)(3-tert-butyldimethylsilyl-5-methyl-2-phenoxy)titanium dichloride, methylene(cyclopentadienyl)(3-trimethylsilyl-5-methyl-2-phenoxy)titanium dichloride, methylene(cyclopentadienyl)(3-tert-butyl-5-methoxy-2-phenoxy)titanium dichloride, methylene(cyclopentadienyl)(3-tert-butyl-5-chloro-2-phenoxy)titanium dichloride, methylene(methylcyclopentadienyl)(3,5-dimethyl-2-phenoxy)titanium dichloride, methylene(methylcyclopentadienyl)(3-tert-butyl-2-phenoxy) titanium dichloride, methylene(methylcyclopentadienyl)(3-tert-butyl-5-methyl-2-phenoxy)titanium dichloride, methylene(methylcyclopentadienyl)(3-phenyl-2-phenoxy) titanium dichloride, methylene(methylcyclopentadienyl)(3-tert-butyldimethylsilyl-5-methyl-2-phenoxy)titanium dichloride, methylene(methylcyclopentadienyl)(3-trimethylsilyl-5-methyl-2-phenoxy)titanium dichloride, methylene (methylcyclopentadienyl)(3-tert-butyl-5-methoxy-2-phenoxy)titanium dichloride, methylene (methylcyclopentadienyl)(3-tert-butyl-5-chloro-2-phenoxy) titanium dichloride, methylene(tetr-butylcyclopentadienyl) (3,5-dimethyl-2-phenoxy)titanium dichloride, methylene (tetr-butylcyclopentadienyl)(3-tert-butyl-2-phenoxy) titanium dichloride, methylene(tetr-butylcyclopentadienyl) (3-tert-butyl-5-methyl-2-phenoxy)titanium dichloride, methylene(tetr-butylcyclopentadienyl)(3-phenyl-2-phenoxy)titanium dichloride, methylene(tetr-butylcyclopentadienyl)(3-tert-butyldimethylsilyl-5-methyl-2-phenoxy)titanium dichloride, methylene(tetr-butylcyclopentadienyl)(3-trimethylsilyl-5-methyl-2-phenoxy)titanium dichloride, methylene(tetr-butylcyclopentadienyl)(3-tert-butyl-5-methoxy-2-phenoxy)titanium dichloride, methylene(tetr-butylcyclopentadienyl)(3-tert-butyl-5-chloro-2-phenoxy)titanium dichloride, methylene(tetramethylcyclopentadienyl)(3,5-dimethyl-2-phenoxy)titanium dichloride, methylene(tetramethylcyclopentadienyl)(3-tert-butyl-2-phenoxy)titanium dichloride, methylene(tetramethylcyclopentadienyl)(3-tert-butyl-5-methyl-2-phenoxy)titanium dichloride, methylene (tetramethylcyclopentadienyl)(3-phenyl-2-phenoxy)titanium dichloride, methylene(tetramethylcyclopentadienyl)(3-tert-butyldimethylsilyl-5-methyl-2-phenoxy)titanium dichloride, methylene(tetramethylcyclopentadienyl)(3-trimethylsilyl-5-methyl-2-phenoxy)titanium dichloride, methylene(tetramethylcyclopentadienyl)(3-tert-butyl-5-methoxy-2-phenoxy)titanium dichloride, methylene (tetramethylcyclopentadienyl)(3-tert-butyl-5-chloro-2-phenoxy)titanium dichloride, methylene (trimethylsilylcyclopentadienyl)(3,5-dimethyl-2-phenoxy) titanium dichloride, methylene (trimethylsilylcyclopentadienyl) (3-tert-butyl-2-phenoxy) titanium dichloride, methylene (trimethylsilylcyclopentadienyl)(3-tert-butyl-5-methyl-2-phenoxy)titanium dichloride, methylene (trimethylsilylcyclopentadienyl)(3-phenyl-2-phenoxy) titanium dichloride, methylene (trimethylsilylcyclopentadienyl)(3-tert-butyldimethylsilyl-5-methyl-2-phenoxy)titanium dichloride, methylene (trimethylsilylcyclopentadienyl)(3-trimethylsilyl-5-methyl-2-phenoxy)titanium dichloride, methylene (trimethylsilylcyclopentadienyl)(3-tert-butyl-5-methoxy-2-phenoxy)titanium dichloride, methylene (trimethylsilylcyclopentadienyl)(3-tert-butyl-5-chloro-2-phenoxy)titanium dichloride, methylene(fluorenyl) (3,5-dimethyl-2-phenoxy)titanium dichloride, methylene (fluorenyl)(3-tert-butyl-2-phenoxy)titanium dichloride, methylene(fluorenyl)(3-tert-butyl-5-methyl-2-phenoxy)titanium dichloride, methylene(fluorenyl)(3-phenyl-2-phenoxy) titanium dichloride, methylene(fluorenyl)(3-tert-butyldimethylsilyl-5-methyl-2-phenoxy)titanium dichloride, methylene(fluorenyl)(3-trimethylsilyl-5-methyl-2-phenoxy) titanium dichloride, methylene(fluorenyl)(3-tert-butyl-5-methoxy-2-phenoxy)titanium dichloride, methylene(fluorenyl)(3-tert-butyl-5-chloro-2-phenoxy)titanium dichloride, isopropylidene(cyclopentadienyl)(3,5-dimethyl-2-phenoxy) titanium dichloride, isopropylidene(cyclopentadienyl)(3-tert-butyl-2-phenoxy)titanium dichloride, isopropylidene (cyclopentadienyl)(3-tert-butyl-5-methyl-2-phenoxy) titanium dichloride, isopropylidene(cyclopentadienyl)(3-phenyl-2-phenoxy)titanium dichloride, isopropylidene (cyclopentadienyl)(3-tert-butyldimethylsilyl-5-methyl-2-phenoxy)titanium dichloride, isopropylidene (cyclopentadienyl)(3-trimethylsilyl-5-methyl-2-phenoxy) titanium dichloride, isopropylidene(cyclopentadienyl)(3-tert-butyl-5-methoxy-2-phenoxy)titanium dichloride, isopropylidene(cyclopentadienyl)(3-tert-butyl-5-chloro-2-phenoxy)titanium dichloride, isopropylidene(methylcyclopentadienyl)(3,5-dimethyl-2-phenoxy)titanium dichloride, isopropylidene(methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene (methylcyclopentadienyl)(3-tert-butyldimethylsilyl-5-methyl-2-phenoxy)titanium dichloride, isopropylidene (methylcyclopentadienyl)(3-trimethylsilyl-5-methyl-2-phenoxy)titanium dichloride, isopropylidene (methylcyclopentadienyl)(3-tert-butyl-5-methoxy-2-phenoxy)titanium dichloride, isopropylidene (methylcyclopentadienyl)(3-tert-butyl-5-chloro-2-phenoxy) titanium dichloride, isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene (tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tert-butylcyclopentadienyl)(3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene (tert-butylcyclopentadienyl)(3-tert-butyl-5-chloro-2-phenoxy)titanium dichloride, isopropylidene (tetramethylcyclopentadienyl)(3,5-dimethyl-2-phenoxy) titanium dichloride, isopropylidene (tetramethylcyclopentadienyl)(3-tert-butyl-2-phenoxy) titanium dichloride, isopropylidene (tetramethylcyclopentadienyl)(3-tert-butyl-5-methyl-2-phenoxy)titanium dichloride, isopropylidene (tetramethylcyclopentadienyl)(3-phenyl-2-phenoxy) titanium dichloride, isopropylidene (tetramethylcyclopentadienyl)(3-tert-butyldimethylsilyl-5-methyl-2-phenoxy)titanium dichloride, isopropylidene (tetramethylcyclopentadienyl)(3-trimethylsilyl-5-methyl-2-phenoxy)titanium dichloride, isopropylidene (tetramethylcyclopentadienyl)(3-tert-butyl-5-methoxy-2-phenoxy)titanium dichloride, isopropylidene (tetramethylcyclopentadienyl)(3-tert-butyl-5-chloro-2-phenoxy)titanium dichloride, isopropylidene (trimethylsilylcyclopentadienyl)(3,5-dimethyl-2-phenoxy) titanium dichloride, isopropylidene (trimethylsilylcyclopentadienyl)(3-tert-butyl-2-phenoxy) titanium dichloride, isopropylidene (trimethylsilylcyclopentadienyl)(3-tert-butyl-5-methyl-2-phenoxy)titanium dichloride, isopropylidene (trimethylsilylcyclopentadienyl)(3-phenyl-2-phenoxy) titanium dichloride, isopropylidene (trimethylsilylcyclopentadienyl)(3-tert-butyldimethylsilyl-5-methyl-2-phenoxy)titanium dichloride, isopropylidene (trimethylsilylcyclopentadienyl)(3-trimethylsilyl-5-methyl-2-phenoxy)titanium dichloride, isopropylidene (trimethylsilylcyclopentadienyl)(3-tert-butyl-5-methoxy-2-phenoxy)titanium dichloride, isopropylidene (trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene (fluorenyl)(3-tert-butyl-2-phenoxy)titanium dichloride, isopropylidene(fluorenyl)(3-tert-butyl-5-methyl-2-phenoxy) titanium dichloride, isopropylidene(fluorenyl)(3-phenyl-2-phenoxy)titanium dichloride, isopropylidene(fluorenyl)(3-tert-butyldimethylsilyl-5-methyl-2-phenoxy)titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy) titanium dichloride, diphenylmethylene(cyclopentadienyl) (3,5-dimethyl-2-phenoxy)titanium dichloride, diphenylmethylene(cyclopentadienyl)(3-tert-butyl-2-phenoxy)titanium dichloride, diphenylmethylene(cyclopentadienyl)(3-tert-butyl-5-methyl-2-phenoxy)titanium dichloride, diphenylmethylene(cyclopentadienyl)(3-phenyl-2-phenoxy)titanium dichloride, diphenylmethylene(cyclopentadienyl)(3-tert-butyldimethylsilyl-5-methyl-2-phenoxy)titanium dichloride, diphenylmethylene(cyclopentadienyl)(3-trimethylsilyl-5-methyl-2-phenoxy)titanium dichloride, diphenylmethylene (cyclopentadienyl)(3-tert-butyl-5-methoxy-2-phenoxy)titanium dichloride, diphenylmethylene(cyclopentadienyl)(3-tert-butyl-5-chloro-2-phenoxy)titanium dichloride, diphenylmethylene(methylcyclopentadienyl)(3,5-dimethyl-2-phenoxy)titanium dichloride, diphenylmethylene(methylcyclopentadienyl)(3-tert-butyl-2-phenoxy)titanium dichloride, diphenylmethylene(methylcyclopentadienyl)(3-tert-butyl-5-methyl-2-phenoxy)titanium dichloride, diphenylmethylene(methylcyclopentadienyl)(3-phenyl-2-phenoxy)titanium dichloride, diphenylmethylene(methylcyclopentadienyl)(3-tert-butyldimethylsilyl-5-methyl-2-phenoxy)titanium dichloride, diphenylmethylene (methylcyclopentadienyl)(3-trimethylsilyl-5-methyl-2-phenoxy)titanium dichloride, diphenylmethylene (methylcyclopentadienyl)(3-tert-butyl-5-methoxy-2-phenoxy)titanium dichloride, diphenylmethylene (methylcyclopentadienyl)(3-tert-butyl-5-chloro-2-phenoxy) titanium dichloride, diphenylmethylene(tert-butylcyclopentadienyl)(3,5-dimethyl-2-phenoxy)titanium dichloride, diphenylmethylene(tert-butylcyclopentadienyl) (3-tert-butyl-2-phenoxy)titanium dichloride, diphenylmethylene(tert-butylcyclopentadienyl)(3-tert-butyl-5-methyl-2-phenoxy)titanium dichloride, diphenylmethylene(tert-butylcyclopentadienyl)(3-phenyl-2-phenoxy)titanium dichloride, diphenylmethylene(tert-butylcyclopentadienyl) (3-tert-butyldimethylsilyl-5-methyl-2-phenoxy)titanium dichloride, diphenylmethylene(tert-butylcyclopentadienyl) (3-trimethylsilyl-5-methyl-2-phenoxy)titanium dichloride, diphenylmethylene(tert-butylcyclopentadienyl)(3-tert-butyl-5-methoxy-2-phenoxy)titanium dichloride, diphenylmethylene(tert-butylcyclopentadienyl)(3-tert-butyl-5-chloro-2-phenoxy)titanium dichloride, diphenylmethylene (tetramethylcyclopentadienyl)(3,5-dimethyl-2-phenoxy) titanium dichloride, diphenylmethylene (tetramethylcyclopentadienyl)(3-tert-butyl-2-phenoxy) titanium dichloride, diphenylmethylene (tetramethylcyclopentadienyl)(3-tert-butyl-5-methyl-2-phenoxy)titanium dichloride, diphenylmethylene (tetramethylcyclopentadienyl)(3-phenyl-2-phenoxy) titanium dichloride, diphenylmethylene (tetramethylcyclopentadienyl)(3-tert-butyldimethylsilyl-5-methyl-2-phenoxy)titanium dichloride, diphenylmethylene (tetramethylcyclopentadienyl)(3-trimethylsilyl-5-methyl-2-phenoxy)titanium dichloride, diphenylmethylene (tetramethylcyclopentadienyl)(3-tert-butyl-5-methoxy-2-phenoxy)titanium dichloride, diphenylmethylene (tetramethylcyclopentadienyl)(3-tert-butyl-chloro-2-phenoxy)titanium dichloride, diphenylmethylene (trimethylsilylcyclopentadienyl)(3,5-dimethyl-2-phenoxy) titanium dichloride, diphenylmethylene (trimethylsilylcyclopentadienyl)(3-tert-butyl-2-phenoxy) titanium dichloride, diphenylmethylene (trimethylsilylcyclopentadienyl)(3-tert-butyl-5-methyl-2-phenoxy)titanium dichloride, diphenylmethylene (trimethylsilylcyclopentadienyl)(3-phenyl-2-phenoxy) titanium dichloride, diphenylmethylene (trimethylsilylcyclopentadienyl)(3-tert-butyldimethylsilyl-5-methyl-2-phenoxy)titanium dichloride, diphenylmethylene(trimethylsilylcyclopentadienyl)(3-trimethylsilyl-5-methyl-2-phenoxy)titanium dichloride, diphenylmethylene(trimethylsilylcyclopentadienyl)(3-tert-butyl-5-methoxy-2-phenoxy)titanium dichloride, diphenylmethylene(trimethylsilylcyclopentadienyl)(3-tert-butyl-5-chloro-2-phenoxy)titanium dichloride, diphenylmethylene(fluorenyl)(3,5-dimethyl-2-phenoxy)titanium dichloride, diphenylmethylene(fluorenyl)(3-tert-butyl-2- phenoxy)titanium dichloride, diphenylmethylene(fluorenyl)(3-tert-butyl-5-methyl-2-phenoxy)titanium dichloride, diphenylmethylene(fluorenyl)(3-phenyl-2-phenoxy)titanium dichloride, diphenylmethylene(fluorenyl)(3-tert-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl)(3-tert-butyl-5-methoxy-2-phenoxy)titanium dichloride, diphenylmethylene(fluorenyl)(3-tert-butyl-5-chloro-2-phenoxy)titanium dichloride, dimethylsilylene(cyclopentadienyl)(2-phenoxy)titanium dichloride, dimethylsilylene(cyclopentadienyl)(3-methyl-2-phenoxy)titanium dichloride, dimethylsilylene(cyclopentadienyl)(3,5-dimethyl-2-phenoxy)titanium dichloride, dimethylsilylene(cyclopentadienyl)(3-tert-butyl-2-phenoxy)titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxy)titanium dichloride, dimethylsilylene(cyclopentadienyl)(3-tert-butyldimethylsilyl-5-methyl-2-phenoxy)titanium dichloride, dimethylsilylene(cyclopentadienyl)(5-methyl-3-trimethylsilyl-2-phenoxy)titanium dichloride, dimethylsilylene(cyclopentadienyl)(3-tert-butyl-5-methoxy-2-phenoxy)titanium dichloride, dimethylsilylene(cyclopentadienyl)(3-tert-butyl-5-chloro-2-phenoxy)titanium dichloride, dimethylsilylene(cyclopentadienyl)(3,5-diamyl-2-phenoxy)titanium dichloride, dimethylsilylene(methylcyclopentadienyl)(2-phenoxy)titanium dichloride, dimethylsilylene(methylcyclopentadienyl)(3-methyl-2-phenoxy)titanium dichloride, dimethylsilylene(methylcyclopentadienyl)(3,5-dimethyl-2-phenoxy)titanium dichloride, dimethylsilylene(methylcyclopentadienyl)(3-tert-butyl-2-phenoxy)titanium dichloride, dimethylsilylene(methylcyclopentadienyl)(3-tert-butyl-5-methyl-2-phenoxy)titanium dichloride, dimethylsilylene(methylcyclopentadienyl)(3,5-di-tert-butyl-2-phenoxy)titanium dichloride, dimethylsilylene(methylcyclopentadienyl)(5-methyl-3-phenyl-2-phenoxy)titanium dichloride, dimethylsilylene(methylcyclopentadienyl)(3-tert-butyldimethylsilyl-5-methyl-2-phenoxy)titanium dichloride, dimethylsilylene(methylcyclopentadienyl)(5-methyl-3-trimethylsilyl-2-phenoxy)titanium dichloride, dimethylsilylene(methylcyclopentadienyl)(3-tert-butyl-5-methoxy-2-phenoxy)titanium dichloride, dimethylsilylene(methylcyclopentadienyl)(3-tert-butyl-5-chloro-2-phenoxy)titanium dichloride, dimethylsilylene(methylcyclopentadienyl)(3,5-diamyl-2-phenoxy)titanium dichloride, dimethylsilylene(n-butylcyclopentadienyl)(2-phenoxy)titanium dichloride, dimethylsilylene(n-butylcyclopentadienyl)(3-methyl-2-phenoxy)titanium dichloride, dimethylsilylene(n-butylcyclopentadienyl)(3,5-dimethyl-2-phenoxy)titanium dichloride, dimethylsilylene(n-butylcyclopentadienyl)(3-tert-butyl-2-phenoxy)titanium dichloride, dimethylsilylene(n-butylcyclopentadienyl)(3-tert-butyl-5-methyl-2-phenoxy)titanium dichloride, dimethylsilylene(n-butylcyclopentadienyl)(3,5-di-tert-butyl-2-phenoxy)titanium dichloride, dimethylsilylene(n-butylcyclopentadienyl)(5-methyl-3-phenyl-2-phenoxy)titanium dichloride, dimethylsilylene(n-butylcyclopentadienyl)(3-tert-butyldimethylsilyl-5-methyl-2-phenoxy)titanium dichloride, dimethylsilylene(n-butylcyclopentadienyl)(5-methyl-3-trimethylsilyl-2-phenoxy)titanium dichloride, dimethylsilylene(n-butylcyclopentadienyl)(3-tert-butyl-5-methoxy-2-phenoxy)titanium dichloride, dimethylsilylene(n-butylcyclopentadienyl)(3-tert-butyl-5-chloro-2-phenoxy)titanium dichloride, dimethylsilylene(n-butylcyclopentadienyl)(3,5-diamyl-2-phenoxy)titanium dichloride, dimethylsilylene(tert-butylcyclopentadienyl)(2-phenoxy)titanium dichloride, dimethylsilylene(tert-butylcyclopentadienyl)(3-methyl-2-phenoxy)titanium dichloride, dimethylsilylene(tert-butylcyclopentadienyl)(3,5-dimethyl-2-phenoxy)titanium dichloride, dimethylsilylene(tert-butylcyclopentadienyl)(3-tert-butyl-2-phenoxy)titanium dichloride, dimethylsilylene(tert-butylcyclopentadienyl)(3-tert-butyl-5-methyl-2-phenoxy)titanium dichloride, dimethylsilylene(tert-butylcyclopentadienyl)(3,5-di-tert-butyl-2-phenoxy)titanium dichloride, dimethylsilylene(tert-butylcyclopentadienyl)(5-methyl-3-phenyl-2-phenoxy)titanium dichloride, dimethylsilylene(tert-butylcyclopentadienyl)(3-tert-butyldimethylsilyl-5-methyl-2-phenoxy)titanium dichloride, dimethylsilylene(tert-butylcyclopentadienyl)(5-methyl-3-trimethylsilyl-2-phenoxy)titanium dichloride, dimethylsilylene(tert-butylcyclopentadienyl)(3-tert-butyl-5-methoxy-2-phenoxy)titanium dichloride, dimethylsilylene(tert-butylcyclopentadienyl)(3-tert-butyl-5-chloro-2-phenoxy)titanium dichloride, dimethylsilylene(tert-butylcyclopentadienyl)(3,5-diamyl-2-phenoxy)titanium dichloride, dimethylsilylene(tetramethylcyclopentadienyl)(2-phenoxy) titanium dichloride, dimethylsilylene(tetramethylcyclopentadienyl)(3-methyl-2-phenoxy)titanium dichloride, dimethylsilylene(tetramethylcyclopentadienyl)(3,5-dimethyl-2-phenoxy)titanium dichloride, dimethylsilylene(tetramethylcyclopentadienyl)(3-tert-butyl-2-phenoxy)titanium dichloride, dimethylsilylene(tetramethylcyclopentadienyl)(3-tert-butyl-5-methyl-2-phenoxy)titanium dichloride, dimethylsilylene(tetramethylcyclopentadienyl)(3,5-di-tert-butyl-2-phenoxy)titanium dichloride, dimethylsilylene(tetramethylcyclopentadienyl)(5-methyl-3-phenyl-2-phenoxy)titanium dichloride, dimethylsilylene(tetramethylcyclopentadienyl)(3-tert-butyldimethylsilyl-5-methyl-2-phenoxy)titanium dichloride, dimethylsilylene(tetramethylcyclopentadienyl)(5-methyl-3-trimethylsilyl-2-phenoxy)titanium dichloride, dimethylsilylene(tetramethylcyclopentadienyl)(3-tert-butyl-5-methoxy-2-phenoxy)titanium dichloride, dimethylsilylene(tetramethylcyclopentadienyl)(3-tert-butyl-5-chloro-2-phenoxy)titanium dichloride, dimethylsilylene(tetramethylcyclopentadienyl)(3,5-diamyl-2-phenoxy) titanium dichloride, dimethylsilylene(trimethylsilylcyclopentadienyl)(2-phenoxy)titanium dichloride, dimethylsilylene(trimethylsilylcyclopentadienyl)(3-methyl-2-phenoxy)titanium dichloride, dimethylsilylene(trimethylsilylcyclopentadienyl)(3,5-dimethyl-2-phenoxy)titanium dichloride, dimethylsilylene(trimethylsilylcyclopentadienyl)(3-tert-butyl-2-phenoxy)titanium dichloride, dimethylsilylene(trimethylsilylcyclopentadienyl)(3-tert-butyl-5-methyl-2-phenoxy)titanium dichloride, dimethylsilylene(trimethylsilylcyclopentadienyl)(3,5-di-tert-butyl-2-phenoxy)titanium dichloride, dimethylsilylene(trimethylsilylcyclopentadienyl)(5-methyl-3-phenyl-2-phenoxy)titanium dichloride, dimethylsilylene(trimethylsilylcyclopentadienyl)(3-tert-butyldimethylsilyl-5-methyl-2-phenoxy)titanium dichloride, dimethylsilylene(trimethylsilylcyclopentadienyl)(5-methyl-3-trimethylsilyl-2-phenoxy)titanium dichloride, dimethylsilylene(trimethylsilylcyclopentadienyl)(3-tert-butyl-5-methoxy-2-phenoxy)titanium dichloride, dimethylsilylene(trimethylsilylcyclopentadienyl)(3-tert-butyl-5-chloro-2-phenoxy)titanium dichloride, dimethylsilylene (trimethylsilylcyclopentadienyl)(3,5-diamyl-2-phenoxy)titanium dichloride, dimethylsilylene(indenyl)(2-phenoxy)titanium dichloride, dimethylsilylene(indenyl)(3-methyl-2-phenoxy)titanium dichloride, dimethylsilylene(indenyl)(3,5-dimethyl-2-phenoxy)titanium dichloride, dimethylsilylene (indenyl)(3-tert-butyl-2-phenoxy)titanium dichloride, dimethylsilylene(indenyl)(3-tert-butyl-5-methyl-2-phenoxy)titanium dichloride, dimethylsilylene(indenyl)(3,5-di-tert-butyl-2-phenoxy)titanium dichloride, dimethylsilylene (indenyl)(5-methyl-3-phenyl-2-phenoxy)titanium dichloride, dimethylsilylene(indenyl)(3-tert-butyldimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl-5-methoxy-2-phenoxy)titanium dichloride, dimethylsilylene (indenyl)(3-tert-butyl-5-chloro-2-phenoxy)titanium dichloride, dimethylsilylene(indenyl)(3,5-diamyl-2-phenoxy)titanium dichloride, dimethylsilylene(fluorenyl)(2-phenoxy)titanium dichloride, dimethylsilylene(fluorenyl)(3-methyl-2-phenoxy)titanium dichloride, dimethylsilylene (fluorenyl)(3,5-dimethyl-2-phenoxy)titanium dichloride, dimethylsilylene(fluorenyl)(3-tert-butyl-2-phenoxy)titanium dichloride, dimethylsilylene(fluorenyl)(3-tert-butyl-5-methyl-2-phenoxy)titanium dichloride, dimethylsilylene (fluorenyl)(3,5-di-tert-butyl-2-phenoxy)titanium dichloride, dimethylsilylene(fluorenyl)(5-methyl-3-phenyl-2-phenoxy) titanium dichloride, dimethylsilylene(fluorenyl)(3-tert-butyldimethylsilyl-5-methyl-2-phenoxy)titanium dichloride, dimethylsilylene(fluorenyl)(5-methyl-3-trimethylsilyl-2-phenoxy)titanium dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy) titanium dichloride, dimethylsilylene(fluorenyl)(3,5-diamyl-2-phenoxy)titanium dichloride, and dimethylsilylene (tetramethylcyclopentadienyl)(1-naphthoxy-2-yl)titanium dichloride; compounds obtained by replacing the term "(2-phenoxy)" of those compounds with the term "(3-phenyl-2-phenoxy)", "(3-trimethylsilyl-2-phenoxy)" or "(3-tert-butyldimethylsilyl-2-phenoxy)"; compounds obtained by replacing the term "dimethylsilylene" of those compounds with the term "diethylsilylene", "diphenylsilylene" or "dimethoxysilylene"; and compounds obtained by replacing the term "dichloride" of those compounds with the term "difluoride", "dibromide", "diiodide" "dimethyl", "diethyl", "diisopropyl", "bis(dimethylamido)", "bis(diethylamido)", "dimethoxide", "diethoxide", "di-n-butoxide" or "diisopropoxide".

Further examples of the transition metal compound represented by the formula (4), wherein $M^1$ is a titanium atom, are (tert-butylamido)tetramethylcyclopentadienyl-1,2-ethanediyltitanium dichloride, (tert-butylamido)tetramethylcyclopentadienyl-1,2-ethanediyltitanium dimethyl, (tert-butylamido)tetramethylcyclopentadienyl-1,2-ethanediyltitanium dibenzyl, (methylamido)tetramethylcyclopentadienyl-1,2-ethanediyltitanium dichloride, (ethylamido)tetramethylcyclopentadienyl-1,2-ethanediyltitanium dichloride, (tert-butylamido)tetramethylcyclopentadienyl dimethylsilanetitanium dichloride, (tert-butylamido)tetramethylcyclopentadienyl dimethylsilanetitanium dimethyl, (tert-butylamido)tetramethylcyclopentadienyl dimethylsilanetitanium dibenzyl, (benzylamido)tetramethylcyclopentadienyl dimethylsilanetitanium dichloride, (phenylphosphido)tetramethylcyclopentadienyl dimethylsilanetitanium dibenzyl, (tert-butylamido)indenyl-1,2-ethanediyltitanium dichloride, (tert-butylamido)indenyl-1,2-ethanediyltitanium dimethyl, (tert-butylamido)tetrahydroindenyl-1,2-ethanediyl titanium dichloride, (tert-butylamido)tetrahydroindenyl-1,2-ethanediyl titanium dimethyl, (tert-butylamido)fluorenyl-1,2-ethanedlyltitanium dichloride, (tert-butylamido)fluorenyl-1,2-ethanediyltitanium dimethyl, (tert-butylamido) indenyldimethylsilanetitanium dichloride, (tert-butylamido) indenyldimethylsilanetitanium dimethyl, (tert-butylamido) tetrahydroindenyldimethylsilane titanium dichloride, (tert-butylamido)tetrahydroindenyldimethylsilane titanium dimethyl, (tert-butylamido)fluorenyldimethylsilanetitanium dichloride, (tert-butylamido)fluorenyldimethylsilanetitanium dimethyl, (dimethylaminomethyl)tetramethylcyclopentadienyl titanium(III) dichloride, (dimethylaminoethyl) tetramethylcyclopentadienyl titanium(III) dichloride, (dimethylaminopropyl)tetramethylcyclopentadienyl titanium(III) dichloride, (N-pyrrolidinylethyl)tetramethylcyclopentadienyl titanium dichloride, (B-dimethylaminoborabenzene)cyclopentadienylzirconium dichloride, cyclopentadienyl(9-mesitylboraanthracenyl)zirconium dichloride, 2,2'-thiobis(4-methyl-6-tert-butylphenoxy)titanium dichloride, 2,2'-thiobis[4-methyl-6-(1-methylethyl) phenoxy]titanium dichloride, 2,2'-thiobis[4,6-dimethylphenoxy]titanium dichloride, 2,2'-methylenebis(4-methyl-6-tert-butylphenoxy)titanium dichloride, 2,2'-ethylenebis(4-methyl-6-tert-butylphenoxy)titanium dichloride, 2,2'-sulfinylbis(4-methyl-6-tert-butylphenoxy)titanium dichloride, 2,2'-(4,4',6,6'-tetra-tert-butyl-1,1'-biphenoxy)titanium dichloride, 2,2'-thiobis[4-methyl-6-tert-butylphenoxy]titanium diisopropoxide, 2,2'-methylenebis(4-methyl-6-tert-butylphenoxy)titanium diisopropoxide, 2,2'-ethylenebis(4-methyl-6-tert-butylphenoxy)titanium diisopropoxide, 2,2'-sulfinylbis(4-methyl-6-tert-butylphenoxy)titanium diisopropoxide, (di-tert-butyl-1,3-propanediamido)titanium dichloride, (dicyclohexyl-1,3-propanediamido)titanium dichloride, [bis(trimethylsilyl)-1,3-propanediamido]titanium dichloride, [bis(tert-butyldimethylsilyl)-1,3-propanediamido]titanium dichloride, [bis(2,6-dimethylphenyl)-1,3-propanediamido] titanium dichloride, [bis(2,6-diisopropylphenyl)-1,3-propanediamido]titanium dichloride, [bis(2,6-di-tert-butylphenyl)-1,3-propanediamido]titanium dichloride, [bis(triisopropylsilyl)naphthalenediamido]titanium dichloride, [bis(trimethylsilyl)naphthalenediamido]titanium dichloride, [bis(tert-butyldimethylsilyl)naphthalenediamido]titanium dichloride, [bis(tert-butyldimethylsilyl)naphthalenediamido]titanium dibromide, [hydrotris(3,5-dimethylpyrazolyl) borate]titanium trichloride, [hydrotris(3,5-dimethylpyrazolyl)borate]titanium tribromide, [hydrotris(3,5-dimethylpyrazolyl)borate]titanium triiodide, [hydrotris(3,5-diethylpyrazolyl)borate]titanium trichloride, [hydrotris(3,5-diethylpyrazolyl)borate]titanium tribromide, [hydrotris(3,5-diethylpyrazolyl)borate]titanium triiodide, [hydrotris(3,5-di-tert-butylpyrazolyl)borate]titanium trichloride, [hydrotris(3,5-di-tert-butylpyrazolyl)borate]titanium tribromide, [hydrotris(3,5-di-tert-butylpyrazolyl)borate]titanium triiodide, [tris(3,5-dimethylpyrazolyl)methyl]titanium trichloride, [tris(3,5-dimethylpyrazolyl)methyl]titanium tribromide, [tris(3,5-dimethylpyrazolyl)methyl]titanium triiodide, [tris(3,5-diethylpyrazolyl)methyl]titanium trichloride, [tris (3,5-diethylpyrazolyl)methyl]titanium tribromide, [tris(3,5-diethylpyrazolyl)methyl]titanium triiodide, [tris(3,5-di-tert-butylpyrazolyl)methyl]titanium trichloride, [tris(3,5-di-tert-butylpyrazolyl)methyl]titanium tribromide, [tris(3,5-di-tert-butylpyrazolyl)methyl]titanium triiodide, μ-oxobis [isopropylidene(cyclopentadienyl)(2-phenoxy)titanium chloride], μ-oxobis[isopropylidene (cyclopentadienyl)(2-phenoxy)titanium methoxide], μ-oxobis[isopropylidene(cyclopentadienyl)(3-tert-butyl-5-methyl-2-phenoxy)titanium chloride], μ-oxobis [isopropylidene(cyclopentadienyl)(3-tert-butyl-5-methyl-2-phenoxy)titanium methoxide], μ-oxobis[isopropylidene (methylcyclopentadienyl)(2-phenoxy)titanium chloride], μ-oxobis[isopropylidene (methylcyclopentadienyl)(2-phenoxy)titanium methoxide], μ-oxobis[isopropylidene (methylcyclopentadienyl)(3-tert-butyl-5-methyl-2-phenoxy)titanium chloride], μ-oxobis[isopropylidene (methylcyclopentadienyl)(3-tert-butyl-5-methyl-2-phenoxy)titanium methoxide], μ-oxobis [isopropylidene (tetramethylcyclopentadienyl)(2-phenoxy) titanium chloride], μ-oxobis[isopropylidene (tetramethylcyclopentadienyl)(2-phenoxy)titanium methoxide], μ-oxobis[isopropylidene (tetramethylcyclopentadienyl)(3-tert-butyl-5-methyl-2-phenoxy)titanium chloride], μ-oxobis[isopropylidene (tetramethylcyclopentadienyl)(3-tert-butyl-5-methyl-2-phenoxy)titanium methoxide], μ-oxobis[dimethylsilylene (cyclopentadienyl)(2-phenoxy)titanium chloride], μ-oxobis[dimethylsilylene (cyclopentadienyl)(2-phenoxy)titanium methoxide], μ-oxobis[dimethylsilylene (cyclopentadienyl)(3-tert-butyl-5-methyl-2-phenoxy)titanium chloride], μ-oxobis [dimethylsilylene(cyclopentadienyl)(3-tert-butyl-5-methyl-2-phenoxy)titanium methoxide], μ-oxobis[dimethylsilylene (methylcyclopentadienyl)(2-phenoxy)titanium chloride], IL-oxobis[dimethylsilylene (methylcyclopentadienyl)(2-phenoxy)titanium methoxide], μ-oxobis[dimethylsilylene (methylcyclopentadienyl)(3-tert-butyl-5-methyl-2-phenoxy) titanium chloride], μ-oxobis[dimethylsilylene (methylcyclopentadienyl)(3-tert-butyl-5-methyl-2-phenoxy) titanium methoxide], μ-oxobis[dimethylsilylene (tetramethylcyclopentadienyl)(2-phenoxy)titanium chloride], μ-oxobis[dimethylsilylene (tetramethylcyclopentadienyl)(2-phenoxy)titanium methoxide], μ-oxobis[dimethylsilylene(tetramethylcyclopentadienyl)(3-tert-butyl-5-methyl-2-phenoxy)titanium chloride], μ-oxobis [dimethylsilylene(tetramethylcyclopentadienyl)(3-tert-butyl-5-methyl-2-phenoxy)titanium methoxide], di-μ-oxobis [isopropylidene(cyclopentadienyl)(2-phenoxy)titanium], di-μ-oxobis[isopropylidene(cyclopentadienyl)(3-tert-butyl-5-methyl-2-phenoxy)titanium], di-μ-oxobis [isopropylidene (methylcyclopentadienyl)(2-phenoxy)titanium], di-μ-oxobis [isopropylidene(methylcyclopentadienyl)(3-tert-butyl-5-methyl-2-phenoxy)titanium], di-μ-oxobis [isopropylidene (tetramethylcyclopentadienyl)(2-phenoxy)titanium], di-μ-oxobis[isopropylidene (tetramethylcyclopentadienyl)(3-tert-butyl-5-methyl-2-phenoxy)titanium], di-μ-oxobis [dimethylsilylene (cyclopentadienyl)(2-phenoxy)titanium], di-g-oxobis [dimethylsilylene(cyclopentadienyl)(3-tert-butyl-5-methyl-2-phenoxy)titanium], di-μ-oxobis[dimethylsilylene (methylcyclopentadienyl)(2-phenoxy)titanium], di-μ-oxobis [dimethylsilylene(methylcyclopentadienyl)(3-tert-butyl-5-methyl-2-phenoxy)titanium], di-μ-oxobis [dimethylsilylene (tetramethylcyclopentadienyl)(2-phenoxy)titanium], and di-μ-oxobis[dimethylsilylene (tetramethylcyclopentadienyl)(3-tert-butyl-5-methyl-2-phenoxy)titanium].

Examples of the transition metal compound represented by the formula (4), wherein $M^1$ is a zirconium atom or a hafnium atom, are compounds obtained by replacing the term "titanium" of the above-exemplified titanium compounds with the term "zirconium" or "hafnium".

Examples of the transition metal compound represented by the formula (4), wherein $M^1$ is a vanadium atom, are vanadium acetylacetonate, vanadium tetrachloride and vanadium oxy trichloride.

An example of the transition metal compound represented by the formula (4), wherein $M^1$ is a samarium atom, is bis (pentamethylcyclopentadienyl)samarium methyltetrahydrofuran.

An example of the transition metal compound represented by the formula (4), wherein $M^1$ is an ytterbium atom, is bis(pentamethylcyclopentadienyl)ytterbium methyltetrahydrofuran.

Examples of the transition metal compound represented by the formula (4), wherein $M^1$ is a palladium atom, are 2,2'-methylenebis[(4R)-4-phenyl-5,5'-dimethyloxazoline]palladium dichloride, 2,2'-methylenebis[(4R)-4-phenyl-5,5'-dimethyloxazoline]palladium dibromide, 2,2'-methylenebis[(4R)-4-phenyl-5,5'-diethyloxazoline]palladium dichloride, 2,2'-methylenebis[(4R)-4-phenyl-5,5'-diethyloxazoline]palladium dibromide, 2,2'-methylenebis[(4R)-4-phenyl-5,5'-di-n-propyloxazoline]palladium dichloride, 2,2'-methylenebis[(4R)-4-phenyl-5,5'-di-n-propyloxazoline]palladium dibromide, 2,2'-methylenebis[(4R)-4-phenyl-5,5'-diisopropyloxazoline]palladium dichloride, 2,2'-methylenebis[(4R)-4-phenyl-5,5'-diisopropyloxazoline]palladium dibromide, 2,2'-methylenebis[(4R)-4-phenyl-5,5'-dicyclohexyloxazoline]palladium dichloride, 2,2'-methylenebis[(4R)-4-phenyl-5,5'-dicyclohexyloxazoline]palladium dibromide, 2,2'-methylenebis[(4R)-4-phenyl-5,5'-dimethoxyoxazoline]palladium dichloride, 2,2'-methylenebis [(4R)-4-phenyl-5,5'-dimethoxyoxazoline]palladium dibromide, 2,2'-methylenebis[(4R)-4-phenyl-5,5'-diethoxyoxazoline]palladium dichloride, 2,2'-methylenebis[(4R)-4-phenyl-5,5'-diethoxyoxazoline]palladium dibromide, 2,2'-methylenebis [(4R)-4-phenyl-5,5'-diphenyloxazoline]palladium dichloride, 2,2'-methylenebis[(4R)-4-phenyl-5,5'-diphenyloxazoline] palladium dibromide, methylenebis[(4R)-4-methyl-5,5'-di-(2-methylphenyl)oxazoline]palladium dibromide, methylenebis[(4R)-4-methyl-5,5'-di-(3-methylphenyl)oxazoline]palladium dibromide, methylenebis[(4R)-4-methyl-5,5'-di-(4-methylphenyl)oxazoline]palladium dibromide, methylenebis[(4R)-4-methyl-5,5'-di-(2-methoxyphenyl)oxazoline]palladium dibromide, methylenebis[(4R)-4-methyl-5,5'-di-(3-methoxyphenyl)oxazoline]palladium dibromide, methylenebis[(4R)-4-methyl-5,5'-di-(4-methoxyphenyl)oxazoline]palladium dibromide, methylenebis[spiro{(4R)-4-methyloxazoline-5,1'-cyclobutane}]palladium dibromide, methylenebis[spiro{(4R)-4-methyloxazoline-5,1'-cyclopentane}]palladium dibromide, methylenebis[spiro{(4R)-4-methyloxazoline-5,1'-cyclohexane}]palladium dibromide, methylenebis[spiro{(4R)-4-methyloxazoline-5,1'-cycloheptane}]palladium dibromide, 2,2'-methylenebis[(4R)-4-isopropyl-5,5'-dimethyloxazoline]palladium dibromide, 2,2'-methylenebis[(4R)-4-isopropyl-5,5'-diethyloxazoline] palladium dibromide, 2,2'-methylenebis[(4R)-4-isopropyl-5,5'-di-n-propyloxazoline]palladium dibromide, methylenebis [(4R)-4-isopropyl-5,5'-diisopropyloxazoline]palladium dibromide, 2,2'-methylenebis[(4R)-4-isopropyl-5,5'-dicyclohexyloxazoline]palladium dibromide, 2,2'-methylenebis [(4R)-4-isopropyl-5,5'-diphenyloxazoline]palladium dibromide, 2,2'-methylenebis[(4R)-4-isopropyl-5,5'-di-(2-methylphenyl)oxazoline]palladium dibromide, 2,2'-methylenebis[(4R)-4-isopropyl-5,5'-di-(3-methylphenyl) oxazoline]palladium dibromide, 2,2'-methylenebis[(4R)-4-isopropyl-5,5'-di-(4-methylphenyl)oxazoline]palladium dibromide, 2,2'-methylenebis[(4R)-4-isopropyl-5,5'-di-(2-methoxyphenyl)oxazoline]palladium dibromide, 2,2'-methylenebis[(4R)-4-isopropyl-5,5'-di-(3-methoxyphenyl)oxazoline]palladium dibromide, 2,2'-methylenebis[(4R)-4-isopropyl-5,5'-di-(4-methoxyphenyl)oxazoline]palladium dibromide, 2,2'-methylenebis[spiro{(4R)-4-isopropyloxazoline-5,1'-cyclobutane}]palladium dibromide, 2,21-methylenebis[spiro{(4R)-4-isopropyloxazoline-5,1'-cyclopentane}]palladium dibromide, 2,2'-methylenebis[spiro{(4R)-4-isopropyloxazoline-5,1'-cyclohexane}]palladium dibromide, 2,2'-methylenebis [spiro{(4R)-4-isopropyloxazoline-5,1'-cycloheptane}]palladium dibromide, 2,2'-methylenebis[(4R)-4-isobutyl-5,5'-dimethyloxazoline]palladium dibromide, 2,2'-methylenebis[(4R)-4-isobutyl-5,5'-diethyloxazoline]palladium dibromide, 2,2'-methylenebis[(4R)-4-isobutyl-5,5'-di-n-propyloxazoline]palladium dibromide, 2,2'-methylenebis[(4R)-4-isobutyl-5,5'-diisopropyloxazoline]palladium dibromide, 2,2'-methylenebis[(4R)-4-isobutyl-5,5'-dicyclohexyloxazoline]palladium dibromide, 2,2'-methylenebis[(4R)-4-isobutyl-5,5'-diphenyloxazoline] palladium dibromide, 2,2'-methylenebis[(4R)-4-isobutyl-5,5'-di-(2-methylphenyl)oxazoline]palladium dibromide, 2,2'-methylenebis[(4R)-4-isobutyl-5,5'-di-(3-methylphenyl)oxazoline]palladium dibromide, 2,2'-methylenebis[(4R)-4-isobutyl-5,5'-di-(4-methylphenyl)oxazoline]palladium dibromide, 2,2'-methylenebis[(4R)-4-isobutyl-5,5'-di-(2-methoxyphenyl)oxazoline]palladium dibromide, 2,2'-methylenebis[(4R)-4-isobutyl-5,5'-di-(3-methoxyphenyl)oxazoline]palladium dibromide, 2,2'-methylenebis[(4R)-4-isobutyl-5,5'-di-(4-methoxyphenyl)oxazoline]palladium dibromide, 2,2'-methylenebis[spiro{(4R)-4-isobutyloxazoline-5,1'-cyclobutane}]palladium dibromide, 2,2'-methylenebis[spiro{(4R)-4-isobutyloxazoline-5,1'-cyclopentane}] palladium dibromide, 2,2'-methylenebis[spiro{(4R)-4-isobutyloxazoline-5,1'-cyclohexane}]palladium dibromide, 2,2'-methylenebis[spiro{(4R)-4-isobutyloxazoline-5,1'-cycloheptane}]palladium dibromide, 2,2'-methylenebis[(4R)-4-tert-butyl-5,5'-dimethyloxazoline]palladium dibromide, 2,2'-methylenebis[(4R)-4-tert-butyl-5,5'-diethyloxazoline] palladium dibromide, 2,2'-methylenebis[(4R)-4-tert-butyl-5,5'-di-n-propyloxazoline]palladium dibromide, 2,2'-methylenebis[(4R)-4-tert-butyl-5,5'-diisopropyloxazoline] palladium dibromide, 2,2'-methylenebis[(4R)-4-tert-butyl-5,5'-diphenyloxazoline]palladium dibromide, 2,2'-methylenebis[(4R)-4-tert-butyl-5,5'-dicyclohexyloxazoline] palladium dibromide, 2,2'-methylenebis[(4R)-4-tert-butyl-5,5'-di-(2-methylphenyl)oxazoline]palladium dibromide, 2,2'-methylenebis[(4R)-4-tert-butyl-5,5'-di-(3-methylphenyl)oxazoline]palladium dibromide, 2,2'-methylenebis[(4R)-4-tert-butyl-5,5'-di-(4-methylphenyl)oxazoline]palladium dibromide, 2'-methylenebis[(4R)-4-tert-butyl-5,5'-di-(2-methoxyphenyl)oxazoline]palladium dibromide, 2,2'-methylenebis[(4R)-4-tert-butyl-5,5'-di-(3-methoxyphenyl)oxazoline]palladium dibromide, 2,2'-methylenebis[(4R)-4-tert-butyl-5,5'-di-(4-methoxyphenyl)oxazoline]palladium dibromide, 2,2'-methylenebis[spiro{(4R)-4-tert-butyloxazoline-5,1'-cyclobutane}]palladium dibromide, 2,2'-methylenebis[spiro{(4R)-4-tert-butyloxazoline-5,1'-cyclopentane}]palladium dibromide, 2,2'-methylenebis[spiro{(4R)-4-tert-butyloxazoline-5,1'-cyclohexane}]palladium dibromide, 2,2'-methylenebis[spiro{(4R)-4-tert-butyloxazoline-5,1'-cycloheptane}]palladium dibromide, 2,2'-methylenebis[(4R)-4-phenyl-5,5'-dimethyloxazoline]palladium dibromide, 2,2'-methylenebis[(4R)-4-phenyl-5,5'-diethyloxazoline]palladium dibromide, 2,2'-methylenebis[(4R)-4-phenyl-5,5'-di-n-propyloxazoline]palladium dibromide, 2,2'-methylenebis[(4R)-4-phenyl-5,5'-diisopropyloxazoline] palladium dibromide, 2,2'-methylenebis[(4R)-4-phenyl-5,5'-dicyclohexyloxazoline]palladium dibromide, 2,2'-methylenebis[(4R)-4-phenyl-5,5'-diphenyloxazoline] palladium dibromide, 2,2'-methylenebis[(4R)-4-phenyl-5,5'-di-(2-methylphenyl)oxazoline]palladium dibromide, 2,2'-methylenebis[(4R)-4-phenyl-5,5'-di-(3-methylphenyl) oxazoline]palladium dibromide, 2,2'-methylenebis[(4R)-4-phenyl-5,5'-di-(4-methylphenyl)oxazoline]palladium dibromide, 2,2'-methylenebis[(4R)-4-phenyl-5,5'-di-(2-methoxyphenyl)oxazoline]palladium dibromide, 2,2'-methylenebis[(4R)-4-phenyl-5,5'-di-(3-methoxyphenyl)oxazoline]palladium dibromide, 2,2'-methylenebis[(4R)-4-phenyl-5,5'-di-(4-methoxyphenyl)oxazoline]palladium dibromide, 2,2'-methylenebis[spiro{(4R)-4-phenyloxazoline-5,1'-cyclobutane}]palladium dibromide, 2,2'-methylenebis[spiro{(4R)-4-phenyloxazoline-5,1'-cyclopentane}]palladium dibromide, 2,2'-methylenebis[spiro{(4R)-4-phenyloxazoline-5,1'-cyclohexane}]palladium dibromide, 2,2'-methylenebis[spiro{(4R)-4-phenyloxazoline-5,1'-cycloheptane}] palladium dibromide, 2,2'-methylenebis[(4R)-4-benzyl-5,5'-dimethyloxazoline]palladium dibromide, 2,2'-methylenebis [(4R)-4-benzyl-5,5'-diethyloxazoline]palladium dibromide, 2,2'-methylenebis[(4R)-4-benzyl-5,5'-di-n-propyloxazoline] palladium dibromide, 2,2'-methylenebis[(4R)-4-benzyl-5,5'-diisopropyloxazoline]palladium dibromide, 2,2'-methylenebis[(4R)-4-benzyl-5,5'-dicyclohexyloxazoline]palladium dibromide, 2,2'-methylenebis[(4R)-4-benzyl-5,5'-diphenyloxazoline]palladium dibromide, 2,2'-methylenebis[(4R)-4-benzyl-5,5'-di-(2-methylphenyl)oxazoline]palladium dibromide, 2'-methylenebis[(4R)-4-benzyl-5,5'-di-(3-methylphenyl)oxazoline]palladium dibromide, 2,2'-methylenebis[(4R)-4-benzyl-5,5'-di-(4-methylphenyl) oxazoline]palladium dibromide, 2,2'-methylenebis[(4R)-4-benzyl-5,5'-di-(2-methoxyphenyl)oxazoline]palladium dibromide, 2,2'-methylenebis[(4R)-4-benzyl-5,5'-di-(3-methoxyphenyl)oxazoline]palladium dibromide, 2,2'-methylenebis[(4R)-4-benzyl-5,5'-di-(4-methoxyphenyl)oxazoline]palladium dibromide, 2,2'-methylenebis[spiro{(4R)-4-benzyloxazoline-5,1'-cyclobutane}]palladium dibromide, 2,2'-methylenebis[spiro{(4R)-4-benzyloxazoline-5,1'-cyclopentane}]palladium dibromide, 2,2'-methylenebis[spiro{(4R)-4-benzyloxazoline-5,1'-cyclohexane}]palladium dibromide, and 2,2'-methylenebis[spiro{(4R)-4-benzyloxazoline-5,1'-cycloheptane}]palladium dibromide; compounds obtained by replacing the term "(4R)" of the above-exemplified compounds with the term "(4S)"; and antipodes and diasteromers of the above-exemplified compounds.

Further examples of the transition metal compound represented by the formula (4), wherein $M^1$ is a palladium atom, are [hydrotris(3,5-dimethylpyrazolyl)borate]palladium chloride, [hydrotris(3,5-dimethylpyrazolyl)borate]palladium bromide, [hydrotris(3,5-dimethylpyrazolyl)borate]palladium iodide, [hydrotris(3,5-dimethylpyrazolyl)borate]palladium methyl, [hydrotris(3,5-dimethylpyrazolyl)borate]palladium ethyl, [hydrotris(3,5-dimethylpyrazolyl)borate] palladium allyl, [hydrotris(3,5-dimethylpyrazolyl)borate] palladium methallyl, [hydrotris(3,5-diethylpyrazolyl)borate] palladium chloride, [hydrotris(3,5-diethylpyrazolyl)borate] palladium bromide, [hydrotris(3,5-diethylpyrazolyl)borate] palladium iodide, [hydrotris(3,5-diethylpyrazolyl)borate] palladium methyl, [hydrotris(3,5-diethylpyrazolyl)borate] palladium ethyl, [hydrotris(3,5-diethylpyrazolyl)borate] palladium allyl, [hydrotris(3,5-diethylpyrazolyl)borate] palladium methallyl, [hydrotris(3,5-di-tert-butylpyrazolyl) borate]palladium chloride, [hydrotris(3,5-di-tert-butylpyrazolyl)borate]palladium bromide, [hydrotris(3,5-di-tert-butylpyrazolyl)borate]palladium iodide, [hydrotris(3,5-di-tert-butylpyrazolyl)borate]palladium methyl, [hydrotris (3,5-di-tert-butylpyrazolyl)borate]palladium ethyl, [hydrotris(3,5-di-tert-butylpyrazolyl)borate]palladium allyl, [hydrotris(3,5-di-tert-butylpyrazolyl)borate]palladium methallyl, chloro(methyl)[N,N'-(ethane-1,2-diylidene)bis (aniline-κN)]palladium, chloro(methyl)[N,N'-(ethane-1,2- diylidene)bis(2-methylaniline-κN)]palladium, chloro(methyl)[N,N'-(ethane-1,2-diylidene)bis(2-ethylaniline-κN)]palladium, chloro(methyl)[N,N'-(ethane-1,2-diylidene)bis(2-n-propylaniline-κN)]palladium, chloro(methyl)[N,N'-(ethane-1,2-diylidene)bis(2-isopropylaniline-κN)]palladium, chloro(methyl)[N,N'-(ethane-1,2-diylidene)bis(2-n-butylaniline-κN)]palladium, chloro(methyl)[N,N'-(ethane-1,2-diylidene)bis(2-isobutylaniline-κN)]palladium, chloro(methyl)[N,N'-(ethane-1,2-diylidene)bis(2-n-hexylaniline-κN)]palladium, chloro(methyl)[N,N'-(ethane-1,2-diylidene)bis(4-methylaniline-κN)]palladium, chloro(methyl)[N,N'-(ethane-1,2-diylidene)bis(2,6-dimethylaniline-κN)]palladium, chloro(methyl)[N,N'-(ethane-1,2-diylidene)bis(2,6-diethylaniline-κN)]palladium, chloro(methyl)[N,N'-(ethane-1,2-diylidene)bis(2,6-di-n-propylaniline-κN)]palladium, chloro(methyl)[N,N'-(ethane-1,2-diylidene)bis(2,6-diisopropylaniline-κN)]palladium, chloro(methyl)[N,N'-(ethane-1,2-diylidene)bis(2,6-di-n-butylaniline-κN)]palladium, chloro(methyl)[N,N'-(ethane-1,2-diylidene)bis(2,6-diisobutylaniline-κN)]palladium, chloro(methyl)[N,N'-(ethane-1,2-diylidene)bis(2,6-di-n-hexylaniline-κN)]palladium, chloro(methyl)[N,N'-(ethane-1,2-diylidene)bis(2-methyl-6-ethylaniline-κN)]palladium, chloro(methyl)[N,N'-(ethane-1,2-diylidene)bis(2-methyl-6-n-propylaniline-κN)]palladium, chloro(methyl)[N,N'-(ethane-1,2-diylidene)bis(2-methyl-6-isopropylaniline-κN)]palladium, chloro(methyl)[N,N'-(ethane-1,2-diylidene)bis(2-methyl-6-butylaniline-κN)]palladium, chloro(methyl)[N,N'-(ethane-1,2-diylidene)bis(2-ethyl-6-n-propylaniline-κN)]palladium, chloro(methyl)[N,N'-(ethane-1,2-diylidene)bis(2-ethyl-6-isopropylaniline-κN)]palladium, chloro(methyl)[N,N'-(ethane-1,2-diylidene)bis(2-ethyl-6-n-butylaniline-κN)]palladium, chloro(methyl)[N,N'-(ethane-1,2-diylidene)bis(2-n-propyl-6-isopropylaniline-κN)]palladium, chloro(methyl)[N,N'-(ethane-1,2-diylidene)bis(2-n-propyl-6-n-butylaniline-κN)]palladium, chloro(methyl)[N,N'-(ethane-1,2-diylidene)bis(2-isopropyl-6-n-butylaniline-κN)]palladium, chloro(methyl)[N,N'-(ethane-1,2-diylidene)bis(2,4,6-trimethylaniline-κN)]palladium, chloro(methyl)[N,N'-(ethane-1,2-diylidene)bis{2,4-dimethyl-6-(2-methylphenyl)aniline-κN}]palladium, chloro(methyl)[N,N'-(ethane-1,2-diylidene)bis{2,4-dimethyl-6-(2-ethylphenyl)aniline-κN}]palladium, chloro(methyl)[N,N'-(ethane-1,2-diylidene)bis{2,4-dimethyl-6-(2-n-propylphenyl)aniline-κN}]palladium, chloro(methyl)[N,N'-(ethane-1,2-diylidene)bis{2,4-dimethyl-6-(2-isopropylphenyl)aniline-κN}]palladium, chloro(methyl)[N,N'-(ethane-1,2-diylidene)bis{2,4-dimethyl-6-(2,6-dimethylphenyl)aniline-κN}]palladium, chloro(methyl)[N,N'-(ethane-1,2-diylidene)bis{2,4-dimethyl-6-(2,6-diethylphenyl)aniline-κN}]palladium, chloro(methyl)[N,N'-(ethane-1,2-diylidene)bis{2,4-dimethyl-6-(2,6-di-n-propylphenyl)aniline-κN}]palladium, chloro(methyl)[N,N'-(ethane-1,2-diylidene)bis{2,4-dimethyl-6-(2,6-diisopropylphenyl)aniline-κN}]palladium, chloro(methyl)[N,N'-(ethane-1,2-diylidene)bis{2,4-dimethyl-6-(2-methyl-6-ethylphenyl)aniline-κN}]palladium, chloro(methyl)[N,N'-(ethane-1,2-diylidene)bis{2,4-dimethyl-6-(2-methyl-6-n-propylphenyl)aniline-κN}]palladium, chloro(methyl)[N,N'-(ethane-1,2-diylidene)bis{2,4-dimethyl-6-(2-methyl-6-isopropylphenyl)aniline-κN}]palladium, chloro(methyl)[N,N'-(ethane-1,2-diylidene)bis{2,4-dimethyl-6-(2-ethyl-6-n-propylphenyl)aniline-κN}]palladium, chloro(methyl)[N,N'-(ethane-1,2-diylidene)bis{2,4-dimethyl-6-(2-ethyl-6-isopropylphenyl)aniline-κN}]palladium, chloro(methyl)[N,N'-(ethane-1,2-diylidene)bis{2,4-dimethyl-6-(1-naphthyl)aniline-κN}]palladium, chloro(methyl)[N,N'-(butane-2,3-diylidene)bis(aniline-κN)]palladium, chloro(methyl)[N,N'-(butane-2,3-diylidene)bis(2-methylaniline-κN)]palladium, chloro(methyl)[N,N'-(butane-2,3-diylidene)bis(2-ethylaniline-κN)]palladium, chloro(methyl)[N,N'-(butane-2,3-diylidene)bis(2-n-propylaniline-κN)]palladium, chloro(methyl)[N,N'-(butane-2,3-diylidene)bis(2-isopropylaniline-κN)]palladium, chloro(methyl)[N,N'-(butane-2,3-diylidene)bis(2-n-butylaniline-κN)]palladium, chloro(methyl)[N,N'-(butane-2,3-diylidene)bis(2-isobutylaniline-κN)]palladium, chloro(methyl)[N,N'-(butane-2,3-diylidene)bis(2-n-hexylaniline-κN)]palladium, chloro(methyl)[N,N'-(butane-2,3-diylidene)bis(4-methylaniline-κN)]palladium, chloro(methyl)[N,N'-(butane-2,3-diylidene)bis(2,6-dimethylaniline-κN)]palladium, chloro(methyl)[N,N'-(butane-2,3-diylidene)bis(2,6-diethylaniline-κN)]palladium, chloro(methyl)[N,N'-(butane-2,3-diylidene)bis(2,6-di-n-propylaniline-κN)]palladium, chloro(methyl)[N,N'-(butane-2,3-diylidene)bis(2,6-diisopropylaniline-κN)]palladium, chloro(methyl)[N,N'-(butane-2,3-diylidene)bis(2,6-di-n-butylaniline-κN)]palladium, chloro(methyl)[N,N'-(butane-2,3-diylidene)bis(2,6-diisobutylaniline-κN)]palladium, chloro(methyl)[N,N'-(butane-2,3-diylidene)bis(2,6-di-n-hexylaniline-κN)]palladium, chloro(methyl)[N,N'-(butane-2,3-diylidene)bis(2-methyl-6-ethylaniline-κN)]palladium, chloro(methyl)[N,N'-(butane-2,3-diylidene)bis(2-methyl-6-n-propylaniline-κN)]palladium, chloro(methyl)[N,N'-(butane-2,3-diylidene)bis(2-methyl-6-isopropylaniline-κN)]palladium, chloro(methyl)[N,N'-(butane-2,3-diylidene)bis(2-methyl-6-butylaniline-κN)]palladium, chloro(methyl)[N,N'-(butane-2,3-diylidene)bis(2-ethyl-6-n-propylaniline-κN)]palladium, chloro(methyl)[N,N'-(butane-2,3-diylidene)bis(2-ethyl-6-isopropylaniline-κN)]palladium, chloro(methyl)[N,N'-(butane-2,3-diylidene)bis(2-ethyl-6-n-butylaniline-κN)]palladium, chloro(methyl)[N,N'-(butane-2,3-diylidene)bis(2-n-propyl-6-isopropylaniline-κN)]palladium, chloro(methyl)[N,N'-(butane-2,3-diylidene)bis(2-n-propyl-6-n-butylaniline-κN)]palladium, chloro(methyl)[N,N'-(butane-2,3-diylidene)bis(2-isopropyl-6-n-butylaniline-κN)]palladium, chloro(methyl)[N,N'-(butane-2,3-diylidene)bis(2,4,6-trimethylaniline-κN)]palladium, chloro(methyl)[N,N'-(butane-2,3-diylidene)bis{2,4-dimethyl-6-(2-methylphenyl)aniline-κN}]palladium, chloro(methyl)[N,N'-(butane-2,3-diylidene)bis{2,4-dimethyl-6-(2-ethylphenyl)aniline-κN})]palladium, chloro(methyl)[N,N'-(butane-2,3-diylidene)bis{2,4-dimethyl-6-(2-n-propylphenyl)aniline-κN})]palladium, chloro(methyl)[N,N'-(butane-2,3-diylidene)bis{2,4-dimethyl-6-(2-isopropylphenyl)aniline-κN}]palladium, chloro(methyl)[N,N'-(butane-2,3-diylidene)bis{2,4-dimethyl-6-(2,6-dimethylphenyl)aniline-κN}]palladium, chloro(methyl)[N,N'-(butane-2,3-diylidene)bis{2,4-dimethyl-6-(2,6-diethylphenyl)aniline-κN}]palladium, chloro(methyl)[N,N'-(butane-2,3-diylidene)bis{2,4-dimethyl-6-(2,6-di-n-propylphenyl)aniline-κN}]palladium, chloro(methyl)[N,N'-(butane-2,3-diylidene)bis{2,4-dimethyl-6-(2,6-diisopropylphenyl)aniline-κN}]palladium, chloro(methyl)[N,N'-(butane-2,3-diylidene)bis{2,4-dimethyl-6-(2-methyl-6-ethylphenyl)aniline-κN}]palladium, chloro(methyl)[N,N'-(butane-2,3-diylidene)bis{2,4-dimethyl-6-(2-methyl-6-n-propylphenyl)aniline-κN}]palladium, chloro(methyl)[N,N'-(butane-2,3-diylidene)bis{2,4-dimethyl-6-(2-methyl-6-isopropylphenyl)aniline-κN}]palladium, chloro(methyl)[N,N'-(butane-2,3-diylidene)bis{2,4-dimethyl-6-(2-ethyl-6-n-propylphenyl)aniline-κN}]palladium, chloro(methyl)[N,N'-(butane-2,3-diylidene)bis{2,4-dimethyl-6-(2-ethyl-6-isopropylphenyl)aniline-κN}]palladium, chloro(methyl)[N,N'-(butane-2,3-diylidene)bis{2,4-dimethyl-6-(1-naphthyl)aniline-κN}]palladium, chloro(methyl)[N,N'-(1,2- dihydroacenaphthylene-1,2-diylidene)bis(aniline-κN)]palladium, chloro(methyl)[N,N'-(1,2-dihydroacenaphthylene-1,2-diylidene)bis(2-methylaniline-κN)]palladium, chloro(methyl)[N,N'-(1,2-dihydroacenaphthylene-1,2-diylidene)bis(2-ethylaniline-κN)]palladium, chloro(methyl)[N,N'-(1,2-dihydroacenaphthylene-1,2-diylidene)bis(2-n-propylaniline-κN)]palladium, chloro(methyl)[N,N'-(1,2-dihydroacenaphthylene-1,2-diylidene)bis(2-isopropylaniline-κN)]palladium, chloro(methyl)[N,N'-(1,2-dihydroacenaphthylene-1,2-diylidene)bis(2-n-butylaniline-κN)]palladium, chloro(methyl)[N,N'-(1,2-dihydroacenaphthylene-1,2-diylidene)bis(2-isobutylaniline-κN)]palladium, chloro(methyl)[N,N'-(1,2-dihydroacenaphthylene-1,2-diylidene)bis(2-n-hexylaniline-κN)]palladium, chloro(methyl)[N,N'-(1,2-dihydroacenaphthylene-1,2-diylidene)bis(4-methylaniline-κN)]palladium, chloro(methyl)[N,N'-(1,2-dihydroacenaphthylene-1,2-diylidene)bis(2,6-dimethylaniline-κN)]palladium, chloro(methyl)[N,N'-(1,2-dihydroacenaphthylene-1,2-diylidene)bis(2,6-diethylaniline-κN)]palladium, chloro(methyl)[N,N'-(1,2-dihydroacenaphthylene-1,2-diylidene)bis(2,6-di-n-propylaniline-κN)]palladium, chloro(methyl)[N,N'-(1,2-dihydroacenaphthylene-1,2-diylidene)bis(2,6-diisopropylaniline-κN)]palladium, chloro(methyl)[N,N'-(1,2-dihydroacenaphthylene-1,2-diylidene)bis(2,6-di-n-butylaniline-κN)]palladium, chloro(methyl)[N,N'-(1,2-dihydroacenaphthylene-1,2-diylidene)bis(2,6-diisobutylaniline-κN)]palladium, chloro(methyl)[N,N'-(1,2-dihydroacenaphthylene-1,2-diylidene)bis(2,6-di-n-hexylaniline-κN)]palladium, chloro(methyl)[N,N'-(1,2-dihydroacenaphthylene-1,2-diylidene)bis(2-methyl-6-ethylaniline-κN)]palladium, chloro(methyl)[N,N'-(1,2-dihydroacenaphthylene-1,2-diylidene)bis(2-methyl-6-n-propylaniline-κN)]palladium, chloro(methyl)[N,N'-(1,2-dihydroacenaphthylene-1,2-diylidene)bis(2-methyl-6-isopropylaniline-κN)]palladium, chloro(methyl)[N,N'-(1,2-dihydroacenaphthylene-1,2-diylidene)bis(2-methyl-6-butylaniline-κN)]palladium, chloro(methyl)[N,N'-(1,2-dihydroacenaphthylene-1,2-diylidene)bis(2-ethyl-6-n-propylaniline-κN)]palladium, chloro(methyl)[N,N'-(1,2-dihydroacenaphthylene-1,2-diylidene)bis(2-ethyl-6-isopropylaniline-κN)]palladium, chloro(methyl)[N,N'-(1,2-dihydroacenaphthylene-1,2-diylidene)bis(2-ethyl-6-n-butylaniline-κN)]palladium, chloro(methyl)[N,N'-(1,2-dihydroacenaphthylene-1,2-diylidene)bis(2-n-propyl-6-isopropylaniline-κN)]palladium, chloro(methyl)[N,N'-(1,2-dihydroacenaphthylene-1,2-diylidene)bis(2-n-propyl-6-n-butylaniline-κN)]palladium, chloro(methyl)[N,N'-(1,2-dihydroacenaphthylene-1,2-diylidene)bis(2-isopropyl-6-n-butylaniline-κN)]palladium, chloro(methyl)[N,N'-(1,2-dihydroacenaphthylene-1,2-diylidene)bis(2,4,6-trimethylaniline-κN)]palladium, chloro(methyl)[N,N'-(1,2-dihydroacenaphthylene-1,2-diylidene)bis{2,4-dimethyl-6-(2-methylphenyl)aniline-κN}]palladium, chloro(methyl)[N,N'-(1,2-dihydroacenaphthylene-1,2-diylidene)bis{2,4-dimethyl-6-(2-ethylphenyl)aniline-κN}]palladium, chloro(methyl)[N,N'-(1,2-dihydroacenaphthylene-1,2-diylidene)bis{2,4-dimethyl-6-(2-n-propylphenyl)aniline-κN}]palladium, chloro(methyl)[N,N'-(1,2-dihydroacenaphthylene-1,2-diylidene)bis{2,4-dimethyl-6-(2-isopropylphenyl)aniline-κN}]palladium, chloro(methyl)[N,N'-(1,2-dihydroacenaphthylene-1,2-diylidene)bis{2,4-dimethyl-6-(2,6-dimethylphenyl)aniline-κN}]palladium, chloro(methyl)[N,N'-(1,2-dihydroacenaphthylene-1,2-diylidene)bis{2,4-dimethyl-6-(2,6-diethylphenyl)aniline-κN}]palladium, chloro(methyl)[N,N'-(1,2-dihydroacenaphthylene-1,2-diylidene)bis{2,4-dimethyl-6-(2,6-di-n-propylphenyl)aniline-κN}]palladium, chloro(methyl)[N,N'-(1,2-dihydroacenaphthylene-1,2-diylidene)bis{2,4-dimethyl-6-(2,6-diisopropylphenyl)aniline-κN}]palladium, chloro(methyl)[N,N'-(1,2-dihydroacenaphthylene-1,2-diylidene)bis{2,4-dimethyl-6-(2-methyl-6-ethylphenyl)aniline-κN}]palladium, chloro(methyl)[N,N'-(1,2-dihydroacenaphthylene-1,2-diylidene)bis{2,4-dimethyl-6-(2-methyl-6-n-propylphenyl)aniline-κN}]palladium, chloro(methyl)[N,N'-(1,2-dihydroacenaphthylene-1,2-diylidene)bis{2,4-dimethyl-6-(2-methyl-6-isopropylphenyl)aniline-κN}]palladium, chloro(methyl)[N,N'-(1,2-dihydroacenaphthylene-1,2-diylidene)bis{2,4-dimethyl-6-(2-ethyl-6-n-propylphenyl)aniline-κN}]palladium, chloro(methyl)[N,N'-(1,2-dihydroacenaphthylene-1,2-diylidene)bis{2,4-dimethyl-6-(2-ethyl-6-isopropylphenyl)aniline-κN}]palladium, and chloro(methyl)[N,N'-(1,2-dihydroacenaphthylene-1,2-diylidene)bis{2,4-dimethyl-6-(1-naphthyl)aniline-κN}]palladium.

Examples of the transition metal compound represented by the formula (4), wherein $M^1$ is a nickel atom, a cobalt atom, a rhodium atom or a ruthenium atom, are compounds obtained by replacing the term "palladium" of the above-exemplified palladium compounds with the term "nickel", "cobalt", "rhodium" or "ruthenium".

Examples of the transition metal compound represented by the formula (4), wherein M is an iron atom, are 2,6-bis-[1-(2,6-dimethylphenylimino)ethyl]pyridineiron dichloride, 2,6-bis-[1-(2,6-diisopropylphenylimino)ethyl]pyridineiron dichloride, 2,6-bis-[1-(2-tert-butylphenylimino)ethyl]pyridineiron dichloride, [hydrotris(3,5-dimethylpyrazolyl)borate]iron chloride, [hydrotris(3,5-dimethylpyrazolyl)borate]iron bromide, [hydrotris(3,5-dimethylpyrazolyl)borate]iron iodide, [hydrotris(3,5-dimethylpyrazolyl)borate]iron methyl, [hydrotris(3,5-dimethylpyrazolyl)borate]iron ethyl, [hydrotris(3,5-dimethylpyrazolyl)borate]iron allyl, [hydrotris(3,5-dimethylpyrazolyl)borate]iron methallyl, [hydrotris(3,5-diethylpyrazolyl)borate]iron chloride, [hydrotris(3,5-diethylpyrazolyl)borate]iron bromide, [hydrotris(3,5-diethylpyrazolyl)borate]iron iodide, [hydrotris(3,5-diethylpyrazolyl)borate]iron methyl, [hydrotris(3,5-diethylpyrazolyl)borate]iron ethyl, [hydrotris(3,5-diethylpyrazolyl)borate]iron allyl, [hydrotris(3,5-diethylpyrazolyl)borate]iron methallyl, [hydrotris(3,5-di-tert-butylpyrazolyl)borate]iron chloride, [hydrotris(3,5-di-tert-butylpyrazolyl)borate]iron bromide, [hydrotris(3,5-di-tert-butylpyrazolyl)borate]iron iodide, [hydrotris(3,5-di-tert-butylpyrazolyl)borate]iron methyl, [hydrotris(3,5-di-tert-butylpyrazolyl)borate]iron ethyl, [hydrotris(3,5-di-tert-butylpyrazolyl)borate]iron allyl, and [hydrotris(3,5-di-tert-butylpyrazolyl)borate]iron methallyl.

Examples of the transition metal compound represented by the formula (4), wherein $M^1$ is a cobalt atom or a nickel atom, are compounds obtained by replacing the term "iron" of the above-exemplified iron compounds with the term "cobalt" or "nickel".

The above-mentioned transition metal compounds may be used in combination of two or more thereof.

The transition metal compound is preferably a compound represented by the following formula [I]:

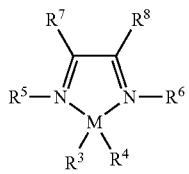

wherein M is a transition metal atom belonging to group 10 of the periodic table; $R^3$ and $R^4$ are independently of each other a hydrogen atom, a halogen atom, an alkyl group, an aralkyl group, an aryl group, a substituent-having silyl group, an alkoxy group, an aralkyloxy group or an aryloxy group; $R^5$ and $R^6$ are independently of each other a hydrocarbyl group having 1 to 30 carbon atoms; and $R^7$ and $R^8$ are independently of each other a hydrogen atom or a hydrocarbyl group having 1 to 20 carbon atoms, and $R^7$ and $R^8$ may be linked with each other.

Examples of the hydrocarbyl group having 1 to 20 carbon atoms of $R^7$ and $R^8$ are an alkyl group and an aryl group. Those groups may have a substituent such as a halogen atom, a hydrocarbyloxy group, a nitro group, a sulfonyl group, and a silyl group. Examples of the alkyl group are a linear alkyl group such as a methyl group, an ethyl group, and a n-butyl group; a branched alkyl group such as an isopropyl group, an isobutyl group, a tert-butyl group, and a neopentyl group; and a cyclic alkyl group such as a cyclohexyl group and a cyclooctyl group. Among them, preferred is an alkyl group having 1 to 20 carbon atoms, more preferred is a linear alkyl group having 1 to 12 carbon atoms, and further preferred is a methyl group or an ethyl group. Examples of the aryl group are a phenyl group, a naphthyl group, a 4-tolyl group, and a mesityl group. Among them, preferred is an aryl group having 6 to 20 carbon atoms, more preferred is an aryl group having 6 to 12 carbon atoms, and further preferred is a phenyl group or a mesityl group.

When $R^7$ and $R^8$ in the formula [I] are linked with each other, examples of a ring formed by said linkage are an aliphatic ring and an aromatic ring. Those rings may have a substituent. Examples of a divalent group formed by a linkage between $R^7$ and $R^8$ in an aliphatic ring are a 1,2-ethylene group, a 1,2-cyclohexylene group, a 1,2-norbornene group, a 2,3-butene group, a 2,3-dimethyl-2,3-butene group, and a 2,4-pentene group. Examples of a divalent group formed by a linkage between $R^7$ and $R^8$ in an aromatic ring are a 1,2-phenylene group and an acenaphthylene group. Among them, preferred is an acenaphthylene group.

Examples of the hydrocarbyl group having 1 to 30 carbon atoms of $R^5$ and $R^6$ in the formula [I] are an alkyl group, an aralkyl group and an aryl group. Those groups may have a substituent such as a halogen atom, a hydrocarbyloxy group, a nitro group, a sulfonyl group, and a silyl group.

Examples of the above-mentioned alkyl group of $R^5$ and $R^6$ are a linear alkyl group such as a methyl group, an ethyl group, and a n-butyl group; a branched alkyl group such as an isopropyl group, an isobutyl group, a tert-butyl group, and a neopentyl group; and a cyclic alkyl group such as a cyclohexyl group and a cyclooctyl group. Among them, preferred is an alkyl group having 1 to 20 carbon atoms, more preferred is a branched alkyl group having 1 to 12 carbon atoms, and further preferred is an isopropyl group or a tert-butyl group.

Examples of the above-mentioned aralkyl group of $R^5$ and $R^6$ are a benzyl group and a phenethyl group. Among them, preferred is an aralkyl group having 7 to 20 carbon atoms, more preferred is an aralkyl group having 7 to 12 carbon atoms, and further preferred is a benzyl group.

Examples of the above-mentioned aryl group of $R^5$ and $R^6$ are a phenyl group, a 2-methylphenyl group, a 2-ethylphenyl group, a 2-n-propylphenyl group, a 2-isopropylphenyl group, a 2-n-butylphenyl group, a 2-isobutylphenyl group, a 2-n-hexylphenyl group, a 4-methylphenyl group, a 2,6-dimethylphenyl group, a 2,6-diethylphenyl group, a 2,6-di-n-propylphenyl group, a 2,6-diisopropylphenyl group, a 2,6-di-n-butylphenyl group, a 2,6-diisobutylphenyl group, a 2,6-di-n-hexylphenyl group, a 2-methyl-6-ethylphenyl group, a 2-methyl-6-n-propylphenyl group, a 2-methyl-6-isopropylphenyl group, a 2-methyl-6-butylphenyl group, a 2-ethyl-6-n-propylphenyl group, a 2-ethyl-6-isopropylphenyl group, a 2-ethyl-6-n-butylphenyl group, a 2-n-propyl-6-isopropylphenyl group, a 2-n-propyl-6-n-butylphenyl group, a 2-isopropyl-6-n-butylphenyl group, a 2,4,6-trimethylphenyl group, a 2,4-dimethyl-6-(2-methylphenyl)phenyl group, a 2,4-dimethyl-6-(2-ethylphenyl)phenyl group, a 2,4-dimethyl-6-(2-n-propylphenyl)phenyl group, a 2,4-dimethyl-6-(2-isopropylphenyl)phenyl group, a 2,4-dimethyl-6-(2,6-dimethylphenyl)phenyl group, a 2,4-dimethyl-6-(2,6-diethylphenyl)phenyl group, a 2,4-dimethyl-6-(2,6-di-n-propylphenyl)phenyl group, a 2,4-dimethyl-6-(2,6-diisopropylphenyl)phenyl group, a 2,4-dimethyl-6-(2-methyl-6-ethylphenyl)phenyl group, a 2,4-dimethyl-6-(2-methyl-6-n-propylphenyl)phenyl group, a 2,4-dimethyl-6-(2-methyl-6-isopropylphenyl)phenyl group, a 2,4-dimethyl-6-(2-ethyl-6-n-propylphenyl)phenyl group, a 2,4-dimethyl-6-(2-ethyl-6-isopropylphenyl)phenyl group, and a 2,4-dimethyl-6-(1-naphthyl)phenyl group. Among them, preferred is an aryl group having 6 to 30 carbon atoms, and more preferred is an aryl group having 7 to 30 carbon atoms.

Examples of the halogen atom of $R^3$ and $R^4$ in the formula [I] are a fluorine atom, a chlorine atom, a bromine atom, and an iodine atom. Among them, preferred is a chlorine atom or a bromine atom.

Examples of the above-mentioned alkyl group of $R^3$ and $R^4$ are a linear alkyl group such as a methyl group, an ethyl group, and a n-butyl group; a branched alkyl group such as an isopropyl group, an isobutyl group, a tert-butyl group, and a neopentyl group; and a cyclic alkyl group such as a cyclohexyl group and a cyclooctyl group. Among them, preferred is an alkyl group having 1 to 20 carbon atoms, more preferred is a linear alkyl group having no substituent and having 1 to 12 carbon atoms, and further preferred is a methyl group.

Examples of the above-mentioned aralkyl group of $R^3$ and $R^4$ are a benzyl group and a phenethyl group. Among them, preferred is an aralkyl group having 7 to 20 carbon atoms, more preferred is an aralkyl group having 7 to 12 carbon atoms, and further preferred is a benzyl group.

Examples of the above-mentioned aryl group of $R^3$ and $R^4$ are a phenyl group, a naphthyl group, a 4-tolyl group, a mesityl group, and a 4-phenylphenyl group. Among them, preferred is an aryl group having 6 to 20 carbon atoms, more preferred is an aryl group having 6 to 12 carbon atoms, and further preferred is a phenyl group, a 4-tolyl group or a mesityl group.

Examples of the above-mentioned substituent-having silyl group of $R^3$ and $R^4$ are a monosubstituent-having silyl group having 1 to 20 carbon atoms such as a methylsilyl group, an ethylsilyl group, and a phenylsilyl group; a disubstituent-having silyl group having 2 to 20 carbon atoms such as a dimethylsilyl group, a diethylsilyl group, and a diphenylsilyl group; a trimethylsilyl group; a triethylsilyl group; a tri-n-propylsilyl group; a triisopropylsilyl group; a tri-n-butylsilyl group; a tri-sec-butylsilyl group; a tri-tert-butylsilyl group; a triisobutylsilyl group; a tert-butylsilyl group; a tri-n-pentylsilyl group; a tri-n-hexylsilyl group; a tricyclohexylsilyl group; and a triphenylsilyl group. Among them, preferred is a trisubstituent-having silyl group having 3 to 20 carbon atoms, and more preferred is a trimethylsilyl group, a tert-butyldimethylsilyl group or a triphenylsilyl group.

Examples of the above-mentioned alkoxy group of $R^3$ and $R^4$ are a methoxy group, an ethoxy group, a n-propoxy group, an isopropoxy group, a n-butoxy group, a sec-butoxy group, a tert-butoxy group, a n-pentyloxy group, a neopentyloxy group, a n-hexyloxy group, a n-octyloxy group, a n-dodecyloxy group, a n-pentadecyloxy group, and a n-eicosyl oxy group. Among them, preferred is an alkoxy group having 1 to 20 carbon atoms, and more preferred is a methoxy group, an ethoxy group, an isopropoxy group, or a tert-butoxy group.

Examples of the above-mentioned aralkyloxy group of $R^3$ and $R^4$ are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a naphthylmethoxy group, and an anthrathenylmethoxy group. Among them, preferred is an aralkyloxy group having 7 to 20 carbon atoms, and more preferred is a benzyloxy group.

Examples of the above-mentioned aryloxy group of $R^3$ and $R^4$ are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,4-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a naphthoxy group, and an anthrathenoxy group. Among them, preferred is an aryloxy group having 6 to 20 carbon atoms.

$R^3$ and $R^4$ in the formula [I] are preferably a hydrogen atom, a halogen atom, an alkyl group or an aryl group, more preferably a hydrogen atom, a halogen atom or a linear alkyl group having no substituent and having 1 to 12 carbon atoms, and particularly preferred is a chlorine atom or a methyl group.

M in the formula [I] is preferably a nickel atom or a palladium atom, and further preferably a palladium atom.

The transition metal compound used in the present invention is preferably a compound represented by the following formula [II], which belongs to the compound represented by the above-mentioned formula [I], in order to produce a diisotactic triad homopolymer having a diisotactic triad of more than 25%, and is preferably a compound represented by the following formula [III], which belongs to the compound represented by the above-mentioned formula [I], in order to produce a disyndiotactic triad homopolymer having a disyndiotactic triad of more than 25%:

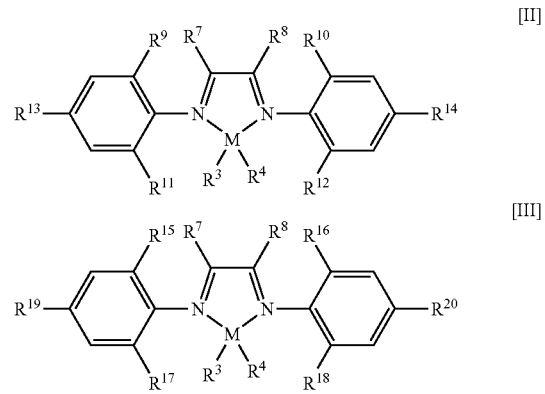

wherein each of M, $R^3$, $R^4$, $R^7$ and $R^8$ has the same definition as that in the above-mentioned formula [I]; $R^9$ and $R^{10}$ are independently of each other a hydrogen atom, a halogen atom, an alkyl group, an aralkyl group, a substituent-having silyl group, an alkoxy group, an aralkyloxy group, a disubstituent-having amino group, or a hyrocarbylthio group; $R^{11}$ and $R^{12}$ are independently of each other an aryl group having 7 to 20; $R^{13}$ and $R^{14}$ are independently of each other a hydrogen atom, a halogen atom, an alkyl group, an aralkyl group, an aryl group, a substituent-having silyl group, an alkoxy group, an aralkyloxy group, an aryloxy group, a disubstituent-having amino group, or a hyrocarbylthio group; $R^{15}$, $R^{16}$, $R^{17}$ and $R^{18}$ are independently of each other a hydrogen atom, a halogen atom, an alkyl group, an aralkyl group, a phenyl group or a phenyl group having 1 to 5 halogen atoms, a substituent-having silyl group, an alkoxy group, an aralkyloxy group, an aryloxy group, a disubstituent-having amino group, or a hyrocarbylthio group; and $R^{19}$ and $R^{20}$ are independently of each other a hydrogen atom, a halogen atom, an alkyl group, an aralkyl group, an aryl group, a substituent-having silyl group, an alkoxy group, an aralkyloxy group, an aryloxy group, a disubstituent-having amino group, or a hyrocarbylthio group.

$R^9$ and $R^{10}$ in the formula [II] are preferably an alkyl group, further preferably an alkyl group having 1 to 12 carbon atoms, and particularly preferably a methyl group, an ethyl group, a n-propyl group, an isopropyl group, a n-butyl group, an isobutyl group, or a tert-butyl group.

Examples of $R^{11}$ and $R^{12}$ in the formula [II] are a 2-methylphenyl group, a 3-methylphenyl group, a 4-methylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 3,6-dimethylphenyl group, a naphthyl group, a 2-methyl-1-naphthyl group, a 3-methyl-1-naphthyl group, a 4-methyl-1-naphthyl group, a 2,3-dimethyl-1-naphthyl group, a 2,4-dimethyl-1-naphthyl group, a 2,5-dimethyl-1-naphthyl group, a 2,6-dimethyl-1-naphthyl group, a 3,4-dimethyl-1-naphthyl group, a 3,5-dimethyl-1-naphthyl group, a 3,6-dimethyl-1-naphthyl group, an anthracenyl group, a 2-methyl-1-anthracenyl group, a 3-methyl-10-anthracenyl group, a 4-methyl-10-anthracenyl group, a 2,3-dimethyl-10-anthracenyl group, a 2,4-dimethyl-10-anthracenyl group, a 2,5-dimethyl-10-anthracenyl group, a 2,6-dimethyl-10-anthracenyl group, a 3,4-dimethyl-10-anthracenyl group, a 3,5-dimethyl-10-anthracenyl group, a 3,6-dimethyl-10-anthracenyl group, and 2-methyl-10-anthracenyl group. Among them, preferred is a substituent-having phenyl group, a naphthyl group or an anthracenyl group, and further preferred is a 2-methylphenyl group or a naphthyl group.

$R^{13}$ and $R^{14}$ in the formula [II] are preferably a hydrogen atom or an alkyl group, more preferably a hydrogen atom or an alkyl group having 1 to 12 carbon atoms, and further preferably a methyl group, an ethyl group, a n-propyl group, an isopropyl group, a n-butyl group, or an isobutyl group.

M in the formula [II] is a transition metal atom belonging to group 10 of the periodic table, and M is preferably a nickel atom or a palladium atom, and further preferably a palladium atom.

$R^{15}$, $R^{16}$, $R^{17}$ and $R^{18}$ in the formula [III] are preferably a hydrogen atom, an alkyl group or an aryl group, more preferably a hydrogen atom, an alkyl group having 1 to 12 carbon atoms, or an aryl group having 6 to 20 carbon atoms, and further preferably a hydrogen atom, a methyl group, an ethyl group, a n-propyl group, an isopropyl group, a n-butyl group, an isobutyl group, a tert-butyl group, or a phenyl group.

$R^{19}$ and $R^{20}$ in the formula [III] are preferably a hydrogen atom, an alkyl group or an aryl group, more preferably a hydrogen atom, an alkyl group having 1 to 12 carbon atoms, or an aryl group having 6 to 20 carbon atoms, and further preferably a hydrogen atom, a methyl group, an ethyl group, a n-propyl group, an isopropyl group, a n-butyl group, an isobutyl group, a tert-butyl group, or a phenyl group.

An organoaluminum compound in the present invention may be a compound known in the art. Examples of the organoaluminum compound are the following compounds (1) to (3), and a combination of two or more thereof:

(1) an organoaluminum compound represented by the formula, $E^1_d AlZ_{3-d}$;

(2) a cyclic alumoxane represented by the formula, $\{-Al(E^2)-O-\}_e$; and (3) a linear alumoxane represented by the formula, $E^3\{-Al(E^3)O-\}_f AlE^3_2$, wherein $E^1$, $E^2$ and $E^3$ are independently of one another a hydrocarbyl group; when plural $E^1$s, $E^2$s or $E^3$s exist, they are the same as, or different from one another; Z is a hydrogen atom or a halogen atom; when plural Zs exist, they are the same as, or different from one another; d is a number satisfying $0<d\leq3$; e is an integer of 2 or more, and preferably an integer of 2 to 40; and f is an integer of 1 or more, and preferably an integer of 1 to 40.

The hydrocarbyl group of $E^1$, $E^2$ and $E^3$ is preferably a hydrocarbyl group having 1 to 8 carbon atoms, and more preferably an alkyl group having 1 to 8 carbon atoms.

Examples of the above-mentioned organoaluminum compound (I) are a trialkylaluminum such as trimethylaluminum, triethylaluminum, tripropylaluminum, triisobutylaluminum, and trihexylaluminum; a dialkylaluminum chloride such as dimethylaluminum chloride, diethylaluminum chloride, dipropylaluminum chloride, diisobutylaluminum chloride and dihexylaluminum chloride; an alkylaluminum dichloride such as methylaluminum dichloride, ethylaluminum dichloride, propylaluminum dichloride, isobutylaluminum dichloride and hexylaluminum dichloride; and a dialkylaluminum hydride such as dimethylaluminum hydride, diethylaluminum hydride, dipropylaluminum hydride, diisobutylaluminum hydride and dihexylaluminum hydride. Among them, preferred is a trialkylaluminum, and more preferred is triethylaluminum or triisobutylaluminum.

An example of $E^2$ and $E^3$ in the above-mentioned formulas is an alkyl group such as a methyl group, an ethyl group, a n-propyl group, an isopropyl group, a n-butyl group, an isobutyl group, a n-pentyl group, and a neopentyl group. Among them, preferred is a methyl group or an isobutyl group.

The above-mentioned cyclic and linear alumoxane can be produced according to various processes. Those processes are not particularly limited, and may be those known in the art. Examples of the process are (i) a process comprising the step of contacting a solution of a trialkylaluminum such as trimethylaluminum in a suitable organic solvent such as benzene and an aliphatic hydrocarbon with water, and (ii) a process comprising the step of contacting a trialkylaluminum such as trimethylaluminum with a crystal water-containing metal salt such as copper sulfate hydrate.

A boron compound in the present invention may be a compound known in the art. Examples of the boron compound are the following compounds (1) to (3), and a combination of two or more thereof:

(1) a boron compound represented by the formula, $BQ^1Q^2Q^3$;

(2) a boron compound represented by the formula, $G^+(BQ^1Q^2Q^3Q^4)^-$; and (3) a boron compound represented by the formula, $(J-H)^+(BQ^1Q^2Q^3Q^4)^-$;

wherein B is a trivalent boron atom; $Q^1$, $Q^2$, $Q^3$ and $Q^4$ are independently of one another a halogen atom, a hydrocarbyl group, a halogenated hydrocarbyl group, a substituent-having silyl group, an alkoxy group, or a disubstituent-having amino group; $G^+$ is an inorganic or organic cation; J is a neutral Lewis base; and $(J-H)^+$ is a Broensted acid.

$Q^1$, $Q^2$, $Q^3$ and $Q^4$ in the above-mentioned three formulas are preferably a halogen atom, a hydrocarbyl group having 1 to 20 carbon atoms, a halogenated hydrocarbyl group having 1 to 20 carbon atoms, a substituent-having silyl group having 1 to 20 carbon atoms, an alkoxy group having 1 to 20 carbon atoms, or a $C_{2-20}$ hydrocarbyl group-having amino group; more preferably a halogen atom, a hydrocarbyl group having 1 to 20 carbon atoms, or a halogenated hydrocarbyl group having 1 to 20 carbon atoms; further preferably a fluorinated $C_{1-20}$ hydrocarbyl group having at least one fluorine atom; and particularly preferably a fluorinated $C_{6-20}$ aryl group having at least one fluorine atom.

Examples of the boron compound represented by the above-mentioned first formula, $BQ^1Q^2Q^3$, are tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, and phenylbis(pentafluorophenyl) borane. Among them, most preferred is tris(pentafluorophenyl)borane.

Examples of an inorganic cation, $G^+$, of the boron compound represented by the above-mentioned second formula, G⁺(BQ¹Q²Q³Q⁴)⁻ are a ferrocenium cation, an alkyl group-having ferrocenium cation, and a silver cation. An example of an organic cation, G⁺, of the boron compound represented thereby is a triphenylmethyl cation. Among them, G⁺ is preferably a carbenium cation, and particularly preferably a triphenylmethyl cation.

Examples of (BQ¹Q²Q³Q⁴)⁻ in the above-mentioned second formula, G⁺(BQ¹Q²Q³Q⁴)⁻, are tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyltris(pentafluorophenyl)borate, and tetrakis(3,5-bistrifluoromethylphenyl)borate.

Examples of the boron compound represented by the above-mentioned second formula, G⁺(BQ¹Q²Q³Q⁴)⁻ are lithium tetrakis(3,5-bistrifluoromethylphenyl)borate, sodium tetrakis(3,5-bistrifluoromethylphenyl)borate, potassium tetrakis(3,5-bistrifluoromethylphenyl)borate, silver tetrakis(pentafluorophenyl)borate, ferrocenium tetrakis(pentafluorophenyl)borate, 1,1'-dimethylferrocenium tetrakis(pentafluorophenyl)borate, tetrabutylphosphponium tetrakis(pentafluorophenyl)borate, tetraphenylphosphponium tetrakis(pentafluorophenyl)borate, tetramethylammonium tetrakis(pentafluorophenyl)borate, trimethylsulphonuim tetrakis(pentafluorophenyl)borate, diphenyliodonium tetrakis(pentafluorophenyl)borate, triphenylcarbenium tetrakis(pentafluorophenyl)borate, and triphenylcarbenium tetrakis(3,5-bistrifluoromethylphenyl)borate. Among them, most preferred is triphenylcarbenium tetrakis(pentafluorophenyl)borate.

Examples of (J—H)⁺ in the above-mentioned third formula, (J—H)⁺(BQ¹Q²Q³Q⁴)⁻, are a trialkylammonium, an N,N-dialkylanilinium, a dialkylammonium, and a triarylphosphonium. Examples of the (BQ¹Q²Q³Q⁴)⁻ therein are the same as those mentioned above.

Examples of the boron compound represented by the above-mentioned third formula, (J-H)⁺ (BQ¹Q²Q³Q⁴)⁻, are triethylammonium tetrakis(pentafluorophenyl)borate, tripropylammonium tetrakis(pentafluorophenyl)borate, tri(n-butyl)ammonium tetrakis(pentafluorophenyl)borate, tri(n-butyl)ammonium tetrakis(3,5-bistrifluoromethylphenyl)borate, N,N-dimethylanilinium tetrakis(pentafluorophenyl)borate, N,N-diethylanilinium tetrakis(pentafluorophenyl)borate, N,N-dimethyl-2,4,6-trimethylanilinium tetrakis(pentafluorophenyl)borate, N,N-dimethylanilinium tetrakis(3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl)phosphonium tetrakis(pentafluorophenyl)borate, and tri(dimethylphenyl)phosphonium tetrakis(pentafluorophenyl)borate. Among them, most preferred is tri(n-butyl)ammonium tetrakis(pentafluorophenyl)borate, or N,N-dimethylanilinium tetrakis(pentafluorophenyl)borate.

The boron compound is preferably the compound represented by the above-mentioned second or third formula, and particularly preferably triphenylcarbenium tetrakis(pentafluorophenyl)borate, tri(n-butyl)ammonium tetrakis(pentafluorophenyl)borate, or N,N-dimethylanilinium tetrakis(pentafluorophenyl)borate.

An amount of the unit represented by the formula (1) contained in the copolymer of the present invention, for example, an amount of the isopropylidene diallylmalonate unit (represented by the formula (1)) contained in a copolymer of isopropylidene diallylmalonate (compound represented by the formula (3)) with ethylene is measured according to a ¹H-NMR method comprising the steps of:

(1) preparing a solution of a copolymer in chloroform-d₁ having a concentration of preferably 4 mg/mL to 2 g/mL;

(2) measuring a ¹H-NMR spectrum of the solution;

(3) obtaining a peak area (A₁) existing in a range of 0.8 to 1.4 ppm based on an ethylene unit (4H) and two methyl groups (6H) derived from R¹ and R² contained in the unit represented by the formula (1);

(4) obtaining a peak area (A₂) existing in a range of 2.3 to 2.6 ppm based on two methylene groups (4H) of the cyclopentane ring contained in the unit represented by the formula (1), said two methylene groups being one methylene group linked to A⁵ (hydrogen atom) and A⁶ (hydrogen atom) and another methylene group linked to A⁷ (hydrogen atom) and A⁸ (hydrogen atom); and (5) calculating an amount of the unit represented by the formula (1) from the following formula, Amount (% by mol) of the unit represented by the formula $$=100\times(A_2)/4\div[(A_2)/4+\{(A_1)-(A_2)6/4\}/4] \quad (1)$$

wherein the total amount of the unit represented by the formula (1) and the ethylene unit is 100% by mol.

An amount of the unit represented by the formula (1) contained in the copolymer of the present invention is not particularly limited. Said amount is generally larger than 0% by mol and smaller than 100% by mol, preferably 10% by mol or larger and smaller than 100% by mol, and more preferably 20% by mol or larger and smaller than 100% by mol, in order to produce a heat resistant copolymer.

A molecular weight of the homopolymer of the present invention is not particularly limited. Its weight-average molecular weight (Mw) is preferably 1,000 to 10,000,000, more preferably 2,000 to 5,000,000, and most preferably 4,000 to 3,000,000.

A molecular weight distribution of the homopolymer of the present invention is not particularly limited. It is preferably 1.0 to 100, more preferably 1.0 to 50, and most preferably 1.0 to 20.

A glass-transition temperature (indicator of heat resistance) of the homopolymer in the present invention is preferably 60° C. or higher, more preferably 70° C. or higher, and most preferably 80° C. or higher.

A molecular weight of the copolymer of the present invention is not particularly limited. Its weight-average molecular weight (Mw) is preferably 1,000 to 10,000,000, more preferably 2,000 to 5,000,000, and most preferably 4,000 to 3,000,000.

A molecular weight distribution of the copolymer of the present invention is not particularly limited. It is preferably 1.0 to 100, further preferably 1.0 to 50, and most preferably 1.0 to 20.

A glass-transition temperature (indicator of heat resistance) of the copolymer in the present invention is preferably 60° C. or higher, more preferably 70° C. or higher, and most preferably 80° C. or higher.

The copolymer of the present invention is soluble in an aromatic solvent such as toluene and xylene, or in a hydrogenated solvent such as chloroform and methylene chloride.

A method for contacting (i) the transition metal compound, (ii) the organoaluminum compound and/or boron compound, and (iii) one or more kinds of monomers, with one another, is not particularly limited.

When forming a polymerization catalyst by contacting the transition metal compound with the organoaluminum compound, the organoaluminum compound is preferably the above-mentioned cyclic alumoxane, linear alumoxane, or a combination thereof, in order to produce a high activity-having polymerization catalyst. When forming a polymerization catalyst by contacting the transition metal compound, the organoaluminum compound and the boron compound with one another, the organoaluminum compound is preferably the organoaluminum compound represented by the above-mentioned first formula, $E^1_d AlZ_{3-d}$, in order to produce a high activity-having polymerization catalyst.

The organoaluminum compound is used in amount of generally 0.1 to 10,000 parts by mol, and preferably 5 to 2,000 parts by mol, per one mol of the transition metal compound. Said amount of smaller than 0.1 part by mol may result in an insufficient activity of a polymerization catalyst. Said amount of larger than 10,000 parts by mol may result in production of a too low molecular weight-having polymer, because of, for example, chain transfer to the organoaluminum compound, or may result in a too low activity of a polymerization catalyst. The boron compound is used in amount of generally 0.01 to 100 parts by mol, and preferably 0.5 to 10 parts by mol, per one mol of the transition metal compound. Said amount of smaller than 0.01 part by mol may result in an insufficient activity of a polymerization catalyst. Said amount of larger than 100 parts by mol is not preferable from an economical point of view.

Each of the transition metal compound, the organoaluminum compound, and the boron compound may be used as a solution thereof. Examples of a solvent for the solution are methylene chloride, chloroform, toluene, pentane, hexane, and heptane. Among them, preferred is methylene chloride, chloroform, or toluene.

A solution of the transition metal compound has a concentration of generally 0.01 to 500 µmol/L, preferably 0.05 to 100 µmol/L, and more preferably 0.05 to 50 µmol/L. A solution of the organoaluminum compound has a concentration of generally 0.01 to 10,000 µmol/L, preferably 0.1 to 5,000 µmol/L, and more preferably 0.1 to 2,000, in terms of an amount of an aluminum atom contained in said solution. A solution of the boron compound has a concentration of generally 0.01 to 500 µmol/L, preferably 0.05 to 200 µmol/L, and more preferably 0.05 to 100 µmol/L. When the solution of the transition metal compound has a concentration of lower than 0.01 µmol/L, when the solution of the organoaluminum compound has a concentration of lower than 0.01 µmol/L in terms of an amount of an aluminum atom contained in said solution, or when the solution of the boron compound has a concentration of lower than 0.01 µmol/L, a large amount of a solvent is necessary to prepare said solution, which is not preferable from an economical point of view. When the solution of the transition metal compound has a concentration of higher than 500 µmol/L, when the solution of the organoaluminum compound has a concentration of higher than 10,000 µmol/L in terms of an amount of an aluminum atom contained in said solution, or when the solution of the boron compound has a concentration of higher than 500 µmol/L, the transition metal compound, the organoaluminum compound, or the boron compound may not be sufficiently dissolved in a solvent, and therefore, said compound may be deposited in the solution.

A polymerization catalyst in the present invention may be combined with a carrier or a support comprising a particle of an inorganic or organic compound. Examples of the inorganic compound are silica gel and alumina, and an example of the organic compound is a styrene unit-containing polymer.

A polymerization method is not particularly limited in the present invention. Examples thereof are a gas-phase polymerization method, a bulk polymerization method, a solution polymerization method using a suitable polymerization solvent, and a suspension polymerization method using the same, which are a batch-wise polymerization method or a continuous polymerization method. Said polymerization solvent is a solvent non-deactivating a polymerization catalyst. Examples of the solvent are a hydrocarbon solvent such as benzene, toluene, pentane, hexane, heptane, and cyclohexane; and a halogenated solvent such as dichloromethane and chloroform.

A polymerization temperature is not particularly limited in the present invention, and generally −100 to 250° C., and preferably −50 to 200° C. The polymerization temperature of lower than −100° C. may result in an insufficient activity of a polymerization catalyst. The polymerization temperature of higher than 250° C. may result in production of a too low molecular weight-having polymer, or may result in non-production of a polymer containing the repeated unit represented by the formula (1) due to occurrence of a side reaction such as an isomerization reaction.

There may be used a chain transfer agent such as hydrogen in order to regulate a molecular weight of a polymer produced.

A polymerization time is not particularly limited in the present invention, and generally one minute to 72 hours. The polymerization time of shorter than one minute may result in an insufficient yield of a polymer produced. The polymerization time of longer than 72 hours is disadvantageous from an economical point of view.

The polymer of the present invention may be combined with various additives such as weatherability stabilizers, lubricants, pigments, dyes, antistatic agents, antioxidants, antifogging agents, rust-inhibiting agents, surfactants, and electroconductive agents. The polymer of the present invention may also be combined with a polymer known in the art such as a low-density polyethylene, a high-density polyethylene, a linear low-density polyethylene, an ethylene-α-olefin copolymer elastomer, and polypropylene.

The present invention is explained with reference to the following Examples, which do not limit the scope of the present invention. The following Examples 1 to 10 relate to the homopolymer of the present invention, and Example 11 to Comparative Example 2 relate to the copolymer of the present invention.

Example 1

(1) Production of Monomer

There was added 0.33 mL of $P(OC_6H_5)_3$ in an atmosphere of a nitrogen gas to a 25 mL-Schlenk tube containing 0.0065 g of $PdCl_2(CH_3CN)_2$ and 0.95 mL of methylene chloride. The resultant mixture was stirred for 15 minutes at a room temperature, and then, 0.07 mL of triethylamine and 4.54 µL of water were added thereto, and the resultant mixture was further stirred for 20 minutes at a room temperature. There was added 5 mL of water thereto, and the resultant mixture was further stirred for 5 minutes at a room temperature. Then, the upper water-layer thereof was removed with a cannula. Volatile matters contained in another organic-layer thereof were distilled away, and the resultant residue was washed with acetone, thereby obtaining $Pd[P(OC_6H_5)_3]_4$. The above-mentioned procedures were carried out according to the method described in Kayaki, Y., Koda, T., Ikariya, T.: J. Org. Chem., 2004, Vol. 69, page 2595.

There were supplied to a 50 mL-round bottom flask 7.69 g of MOLECULAR SIEVES 3A, 35 mL of toluene, 49.7 mg of the above-produced $Pd(OC_6H_5)_3$, 5.04 g of 2,2-dimethyl-1,3-dioxane-4,6-dione, and 4.9 ml of allyl alcohol, and the resultant mixture was stirred for 2 hours at 80° C. in an atmosphere of a nitrogen gas. The reaction mixture was filtered, and toluene contained in the filtrate was distilled away.

The resultant residue was purified according to a column chromatography having a stationary phase of silica gel and a mobile phase of a mixed solvent consisting of 8 parts by weight of hexane and 1 part by weight of ethyl acetate, thereby obtaining 6.22 g of clear and oily isopropylidene diallylmalonate (monomer).

(2) Polymerization of Monomer

There was added 0.5 mL of methylene chloride to a 25 mL-Schlenk tube containing 6.57 mg of chloro(methyl)[N,N'-(1,2-dihydroacenaphthylene-1,2-diylidene)bis(2,6-diisopropylaniline-κN)]palladium (transition metal compound) and 10.6 mg of sodium tetrakis(3,5-bistrifluoromethylphenyl)borate (boron compound), and the resultant mixture was stirred for 30 minutes at a room temperature. Then, there was added thereto 0.156 g of the above-produced isopropylidene diallylmalonate (monomer), and the resultant mixture was stirred for 48 hours at a room temperature to polymerize the monomer.

The obtained homopolymer had a number-average molecular weight (Mn) of 8,200; a molecular weight distribution (Mw/Mn) of 1.6; 100% of a trans-form in view of its configuration between the main chain and the five-membered ring; 67% of a threodisyndiotactic triad; and no glass-transition temperature in a range between −60° C. to 150° C. Results are shown in Table 1.

The above-mentioned number-average molecular weight (Mn) and molecular weight distribution (Mw/Mn) were measured under the following conditions according to a gel permeation chromatography (GPC) using an equipment manufactured by JASCO Corporation having a degasser (DG-980-50), a pump (PU-980), an auto-sampler (AS-950), a column oven (CO-966), an RI detector (RI-930) and a UV detector (UV-975), with a calibration curve prepared using standard polystyrenes:

- two columns, SHODEX-806L, manufactured by Showa Denko K.K.;
- measurement temperature of 40° C.;
- solvent of chloroform; and
- sample concentration of 1 mg-sample/mL-solution.

The above-mentioned glass-transition temperature was measured according to a differential scanning calorimetry (DSC) using an equipment, SSC-5200, manufactured by Seiko Instruments & Electronics Ltd. under the following conditions:

- heating from 25° C. to 135° C. at a rate of 10° C./minute, and keeping at 135° C. for 5 minutes; then,
- cooling from 135° C. to −60° C. at a rate of 20° C./minute, and keeping at −60° C. for 5 minutes; and then,
- measuring under heating from −60° C. to 150° C. at a rate of 10° C./minute.

The above-mentioned proportion of the trans-form was measured under the following conditions according to a $^{13}$C-NMR method using an equipment, LA-500, manufactured by JEOL LTD:

- measurement solvent of chloroform-$d_1$;
- measurement temperature of room temperature;
- sample concentration of 50 mg-sample/0.5 mL-solution; and
- reference material of chloroform-$d_1$ (77 ppm).

The above-mentioned stereoregularity was measured using an equipment, LA-500, manufactured by JEOL LTD according to a $^{13}$C-NMR method comprising the steps of:

(1) preparing a solution of a polymer in chloroform-$d_1$ having a concentration of preferably 286 mg/mL;

(2) measuring a $^{13}$C-NMR spectrum of the solution;

(3) obtaining a peak area ($A_1$) existing in a range of 46.2 to 46.6 ppm in the spectrum, and a peak area ($A_2$) existing in a range of 46.9 to 47.3 ppm therein, respectively, provided that a peak assigned to chloroform-$d_1$ appears at 77 ppm; and (4) calculating the stereoregularity based on the following formulas, threodiisotactic triad(%)=$100A_1/(A_3+A_2)$ threodisyndiotactic triad(%)=$100A_2/(A_1+A_2)$.

Example 2

There was added 0.5 mL of methylene chloride to a 25 mL-Schlenk tube containing 5.89 mg of chloro(methyl)[N,N'-(1,2-dihydroacenaphthylene-1,2-diylidene)bis(2,4,6-trimethylaniline-κN)]palladium (transition metal compound) and 10.6 mg of sodium tetrakis(3,5-bistrifluoromethylphenyl)borate (boron compound), and the resultant mixture was stirred for 5 minutes at a room temperature. Then, there was added thereto 0.156 g of isopropylidene diallylmalonate (monomer), and the resultant mixture was stirred for 24 hours at a room temperature to polymerize the monomer.

The obtained homopolymer had a number-average molecular weight (Mn) of 9,200; a molecular weight distribution (Mw/Mn) of 1.8; 100% of a trans-form in view of its configuration between the main chain and the five-membered ring; no stereoregularity; and no glass-transition temperature in a range between −60° C. to 150° C. Results are shown in Table 1.

Example 3

There was added 0.5 mL of methylene chloride to a 25 mL-Schlenk tube containing 5.61 mg of chloro(methyl)[N,N'-(butane-2,3-diylidene)bis (2,6-diisopropylaniline-κN)] palladium (transition metal compound) and 10.6 mg of sodium tetrakis(3,5-bistrifluoromethylphenyl)borate (boron compound), and the resultant mixture was stirred for 20 minutes at a room temperature. Then, there was added thereto 0.156 g of isopropylidene diallylmalonate (monomer), and the resultant mixture was stirred for 36 hours at a room temperature to polymerize the monomer.

The obtained homopolymer had a number-average molecular weight (Mn) of 6,500; a molecular weight distribution (Mw/Mn) of 1.6; 100% of a trans-form in view of its configuration between the main chain and the five-membered ring; no stereoregularity; and no glass-transition temperature in a range between −60° C. to 150° C. Results are shown in Table 1.

Example 4

There was added 0.5 mL of methylene chloride to a 25 mL-Schlenk tube containing 4.77 mg of chloro(methyl)[N,N'-(butane-2,3-diylidene)bis (2,4,6-trimethylaniline-κN)] palladium (transition metal compound) and 10.6 mg of sodium tetrakis(3,5-bistrifluoromethylphenyl)borate (boron compound), and the resultant mixture was stirred for 20 minutes at a room temperature. Then, there was added thereto 0.156 g of isopropylidene diallylmalonate (monomer), and the resultant mixture was stirred for 24 hours at a room temperature to polymerize the monomer.

The obtained homopolymer had a number-average molecular weight (Mn) of 9,800; a molecular weight distribution (Mw/Mn) of 1.6; 100% of a trans-form in view of its configuration between the main chain and the five-membered ring; 65% of a threodisyndiotactic triad; and no glass-transition temperature in a range between −60° C. to 150° C. Results are shown in Table 1.

Example 5

There was added 0.5 mL of methylene chloride to a 25 mL-Schlenk tube containing 6.60 mg of chloro(methyl)[N,N'-(1,2-dihydroacenaphthylene-1,2-diylidene)bis(2,4,6-trimethylaniline-κN)]palladium (transition metal compound) and 10.6 mg of sodium tetrakis(3,5-bistrifluoromethylphenyl)borate (boron compound), and the resultant mixture was stirred for 20 minutes at a room temperature. Then, methylene chloride was distilled away from the mixture, and 0.5 mL of toluene and 0.156 g of isopropylidene diallylmalonate (monomer) were added thereto. The resultant mixture was stirred for 48 hours at a room temperature to polymerize the monomer.

The obtained homopolymer had a number-average molecular weight (Mn) of 6,000; a molecular weight distribution (Mw/Mn) of 1.6; 100% of a trans-form in view of its configuration between the main chain and the five-membered ring; no stereoregularity; and no glass-transition temperature in a range between −60° C. to 150° C. Results are shown in Table 1.

Example 6

There was added 0.5 mL of methylene chloride to a 25 mL-Schlenk tube containing 6.60 mg of chloro(methyl)[N,N'-(1,2-dihydroacenaphthylene-1,2-diylidene)bis(2,4,6-trimethylaniline-κN)]palladium (transition metal compound) and 10.6 mg of sodium tetrakis(3,5-bistrifluoromethylphenyl)borate (boron compound), and the resultant mixture was stirred for 10 minutes at a room temperature. Then, methylene chloride was distilled away from the mixture, and 0.445 g of isopropylidene diallylmalonate (monomer) were added thereto. The resultant mixture was stirred for 24 hours at a room temperature to polymerize the monomer.

The obtained homopolymer had a number-average molecular weight (Mn) of 18,400; a molecular weight distribution (Mw/Mn) of 1.4; 100% of a trans-form in view of its configuration between the main chain and the five-membered ring; no stereoregularity; and no glass-transition temperature in a range between −60° C. to 15° C. Results are shown in Table 1.

Example 7

There was added 0.5 mL of methylene chloride to a 25 mL-Schlenk tube containing 6.17 mg of chloro(methyl)[N,N'-(1,2-dihydroacenaphthylene-1,2-diylidene)bis(2,6-diisopropylaniline-κN)]palladium (transition metal compound) and 10.6 mg of sodium tetrakis(3,5-bistrifluoromethylphenyl)borate (boron compound), and the resultant mixture was stirred for 20 minutes at a room temperature. Then, 0.156 g of isopropylidene diallylmalonate (monomer) was added thereto, and the resultant mixture was stirred for 24 hours at a room temperature to polymerize the monomer.

The obtained homopolymer had a number-average molecular weight (Mn) of 9,000; a molecular weight distribution (Mw/Mn) of 1.6; 100% of a trans-form in view of its configuration between the main chain and the five-membered ring; 64% of a threodisyndiotactic triad; and no glass-transition temperature in a range between −60° C. to 15° C. Results are shown in Table 1.

Example 8

There was added 0.5 mL of methylene chloride to a 25 mL-Schlenk tube containing 7.52 mg of chloro(methyl)[N,N'-(1,2-dihydroacenaphthylene-1,2-diylidene)bis(2-isopropyl-6-phenylaniline-κN)]palladium (transition metal compound) and 10.6 mg of sodium tetrakis(3,5-bistrifluoromethylphenyl)borate (boron compound), and the resultant mixture was stirred for 30 minutes at a room temperature. Then, 0.156 g of isopropylidene diallylmalonate (monomer) was added thereto, and the resultant mixture was stirred for 36 hours at a room temperature to polymerize the monomer.

The obtained homopolymer had a number-average molecular weight (Mn) of 6,300; a molecular weight distribution (Mw/Mn) of 1.7; 100% of a trans-form in view of its configuration between the main chain and the five-membered ring; 68% of a threodisyndiotactic triad; and no glass-transition temperature in a range between −60° C. to 150° C. Results are shown in Table 1.

Example 9

There was added 0.25 mL of methylene chloride to a 25 mL-Schlenk tube containing 7.25 mg of chloro(methyl)[N,N'-(1,2-dihydroacenaphthylene-1,2-diylidene)bis(2,4-dimethyl-6-(2-methylphenyl)aniline-κN)]palladium (transition metal compound) and 10.6 mg of sodium tetrakis(3,5-bistrifluoromethylphenyl)borate (boron compound), and the resultant mixture was stirred for 5 minutes at a room temperature. Then, 0.156 g of isopropylidene diallylmalonate (monomer) was added thereto, and the resultant mixture was stirred for 29 hours at a room temperature to polymerize the monomer.

The obtained homopolymer had a number-average molecular weight (Mn) of 8,400; a molecular weight distribution (Mw/Mn) of 1.8; 100% of a trans-form in view of its configuration between the main chain and the five-membered ring; 66% of a threodiisotactic triad; and no glass-transition temperature in a range between −60° C. to 150° C. Results are shown in Table 1.

Example 10

There was added 0.25 mL of methylene chloride to a 25 mL-Schlenk tube containing 7.97 mg of chloro(methyl)[N,N'-(1,2-dihydroacenaphthylene-1,2-diylidene)bis(2,4-dimethyl-6-(1-naphthyl)aniline-κN)]palladium (transition metal compound) and 10.6 mg of sodium tetrakis(3,5-bistrifluoromethylphenyl)borate (boron compound), and the resultant mixture was stirred for 5 minutes at a room temperature. Then, 0.156 g of isopropylidene diallylmalonate (monomer) was added thereto, and the resultant mixture was stirred for 24 hours at a room temperature to polymerize the monomer.

The obtained homopolymer had a number-average molecular weight (Mn) of 4,400; a molecular weight distribution (Mw/Mn) of 1.7; 100% of a trans-form in view of its configuration between the main chain and the five-membered ring; 83% of a threodiisotactic triad; and no glass-transition temperature in a range between −60° C. to 150° C. Results are shown in Table 1.

Example 11

There was supplied 0.314 g (1.4 mmol) of isopropylidene diallylmalonate (monomer) to a 50 mL-volume round bottom flask equipped with a three-way cock. Said monomer was freeze-degassed, and then, said flask was filled with a mixed gas consisting of 25% by mol of ethylene gas and 75% by mol of argon gas.

On the other hand, there was added 0.75 mL of methylene chloride to a 25 mL-Schlenk tube containing 9.86 mg (0.015 mmol) of chloro(methyl)[N,N'-(1,2-dihydroacenaphthylene-1,2-diylidene)bis(2,6-diisopropylaniline-κN)]palladium (transition metal compound) and 15.9 mg (0.018 mmol) of sodium tetrakis(3,5-bistrifluoromethylphenyl)borate (boron compound), and the resultant mixture was stirred for 5 minutes at a room temperature, thereby preparing a solution of a cationic palladium in methylene chloride.

There was added 0.5 mL (containing 0.01 mmol of the palladium complex) of the above-prepared solution of a cationic palladium in methylene chloride with a syringe to the above-prepared round bottom flask. A balloon containing a mixed gas consisting of 25% by mol of ethylene gas and 75% by mol of argon gas was fixed to the three-way cock of the round bottom flask, and the mixture contained in the round bottom flask was stirred for 2 hours at a room temperature, under a total pressure of 0.1 MPa and an ethylene-partial pressure of 0.025 MPa. The reaction mixture was poured into about 50 mL of methanol to separate a copolymer, and 0.07 g of a dried copolymer was obtained.

So obtained copolymer contained an isopropylidene diallylmalonate unit in an amount of 25% by mol, the total amount of all the monomer units being 100% by mol, and therefore, an ethylene unit in an amount of 75% by mol (100% by mol–25% by mol), and had a number-average molecular weight (Mn) of 8,000; a molecular weight distribution (Mw/Mn) of 1.2; a solid state at a room temperature; and no endothermic peak at 140° C. or lower in a differential thermal analysis (DTA). Results are shown in Table 2.

The above-mentioned heat resistance (DTA) was measured with a thermogravimetry (TG)/differential thermal analysis (DTA) equipment, SSC-5200, manufactured by Seiko Instruments Inc. under heating from 25° C. to 500° C. at a rate of 10° C./minute.

The above-mentioned content of the isopropylidene diallylmalonate unit was measured under the following conditions according to a $^1$H-NMR method using an equipment, LA-500, manufactured by JEOL LTD:
measurement solvent of chloroform-$d_1$;
measurement temperature of room temperature;
sample concentration of 50 mg-sample/0.5 mL-solution; and
reference material of chloroform-$d_1$ (7.24 ppm).

Example 12

Example 11 was repeated except that the transition metal compound was changed to 0.015 mmol of chloro(methyl)[N,N'-(1,2-dihydroacenaphthylene-1,2-diylidene)bis(2,4,6-trimethylaniline-κN)]palladium.

There was obtained 0.105 g of a dried copolymer, which contained an isopropylidene diallylmalonate unit in an amount of 52% by mol, the total amount of all the monomer units being 100% by mol, and therefore, an ethylene unit in an amount of 48% by mol (100% by mol–52% by mol), and had a number-average molecular weight (Mn) of 8,500; a molecular weight distribution (Mw/Mn) of 1.3; a solid state at a room temperature; and no endothermic peak at 140° C. or lower in a differential thermal analysis (DTA). Results are shown in Table 2.

Example 13

Example 11 was repeated except that the transition metal compound was changed to 0.015 mmol of chloro(methyl)[N, N'-(1,2-dihydroacenaphthylene-1,2-diylidene)bis(2-methyl-6-isopropylaniline-κN)]palladium.

There was obtained 0.106 g of a dried copolymer, which contained an isopropylidene diallylmalonate unit in an amount of 39% by mol, the total amount of all the monomer units being 100% by mol, and therefore, an ethylene unit in an amount of 61% by mol (100% by mol–39% by mol), and had a number-average molecular weight (Mn) of 9,300; a molecular weight distribution (Mw/Mn) of 1.5; a solid state at a room temperature; and no endothermic peak at 140° C. or lower in a differential thermal analysis (DTA). Results are shown in Table 2.

Example 14

Example 11 was repeated except that (i) the transition metal compound was changed to 0.015 mmol of chloro(methyl)[N,N'-(1,2-dihydroacenaphthylene-1,2-diylidene)bis(2,4,6-trimethylaniline-κN)]palladium, (ii) the amount of isopropylidene diallylmalonate (monomer) was changed to 0.157 g, (iii) the ethylene-argon mixed gas was changed to an ethylene gas, and (iv) the ethylene gas pressure was changed to 0.1 MPa.

There was obtained 0.087 g of a dried copolymer, which contained an isopropylidene diallylmalonate unit in an amount of 12% by mol, the total amount of all the monomer units being 100% by mol, and therefore, an ethylene unit in an amount of 88% by mol (100% by mol–12% by mol), and had a number-average molecular weight (Mn) of 6,100; a molecular weight distribution (Mw/Mn) of 1.5; a solid state at a room temperature; and no endothermic peak at 140° C. or lower in a differential thermal analysis (DTA). Results are shown in Table 2.

Example 15

Example 11 was repeated except that (i) the transition metal compound was changed to 0.015 mmol of chloro(methyl)[N,N'-(butane-2,3-diylidene)bis(aniline-κN)]palladium, (ii) the amount of isopropylidene diallylmalonate (monomer) was changed to 0.157 g, (iii) the ethylene-argon mixed gas was changed to an ethylene gas, and (iv) the ethylene gas pressure was changed to 0.1 MPa.

There was obtained 0.251 g of a dried copolymer, which contained an isopropylidene diallylmalonate unit in an amount of 7% by mol, the total amount of all the monomer units being 100% by mol, and therefore, an ethylene unit in an amount of 93% by mol (100% by mol–7% by mol), and had a number-average molecular weight (Mn) of 52,000; a molecular weight distribution (Mw/Mn) of 2.5; a solid state at a room temperature; and no endothermic peak at 140° C. or lower in a differential thermal analysis (DTA). Results are shown in Table 2.

Example 16

There were supplied 0.156 g (0.7 mmol) of isopropylidene diallylmalonate (monomer) and 58.9 mg (0.7 mmol) of 1-hexene to a 50 mL-volume round bottom flask equipped with a three-way cock. Said monomers were freeze-degassed, and then, said flask was filled with an argon gas.

On the other hand, there was added 0.5 mL of methylene chloride to a 25 mL-Schlenk tube containing 6.6 mg (0.010 mmol) of chloro(methyl)[N,N'-(1,2-dihydroacenaphthylene-1,2-diylidene)bis(2,6-diisopropylaniline-κN)]palladium (transition metal compound) and 13.2 mg (0.012 mmol) of sodium tetrakis(3,5-bistrifluoromethylphenyl)borate (boron compound), and the resultant mixture was stirred for 5 minutes at a room temperature, thereby preparing a solution of a cationic palladium in methylene chloride.

There was added 0.5 mL (containing 0.01 mmol of the palladium complex) of the above-prepared solution of a cationic palladium in methylene chloride with a syringe to the above-prepared round bottom flask, and the mixture contained in the round bottom flask was stirred for 24 hours at a room temperature. The reaction mixture was poured into about 50 mL of methanol to separate a copolymer, and 0.188 g of a dried copolymer was obtained.

So obtained copolymer contained an isopropylidene diallylmalonate unit in an amount of 45% by mol, the total amount of all the monomer units being 100% by mol, and therefore, a 1-hexene unit in an amount of 55% by mol (100% by mol–45% by mol), and had a number-average molecular weight (Mn) of 8,000; a molecular weight distribution (Mw/Mn) of 2.1; a solid state at a room temperature; and no endothermic peak at 140° C. or lower in a differential thermal analysis (DTA). Results are shown in Table 2.

Example 17

There were supplied 0.156 g (0.7 mmol) of isopropylidene diallylmalonate (monomer), 35 µL (0.25 mmol) of mesitylene (internal standard substance) and 0.87 µL (0.7 mmol) of 1-hexene to a 50 mL-volume round bottom flask equipped with a three-way cock. Said mixture was freeze-degassed, and then, said flask was filled with ethylene gas.

On the other hand, there was added 0.75 mL of methylene chloride to a 25 mL-Schlenk tube containing 9.86 mg (0.015 mmol) of chloro(methyl)[N,N'-(1,2-dihydroacenaphthylene-1,2-diylidene)bis(2,6-diisopropylaniline-κN)]palladium (transition metal compound) and 15.9 mg (0.018 mmol) of sodium tetrakis(3,5-bistrifluoromethylphenyl)borate (boron compound), and the resultant mixture was stirred for 10 minutes at a room temperature, thereby preparing a solution of a cationic palladium in methylene chloride.

There was added 0.25 mL (containing 0.01 mmol of the palladium complex) of the above-prepared solution of a cationic palladium in methylene chloride with a syringe to the above-prepared round bottom flask. A balloon containing an ethylene gas was fixed to the three-way cock of the round bottom flask, and the mixture contained in the round bottom flask was stirred for 3 hours at a room temperature under an ethylene pressure of 0.1 MPa. The reaction mixture was poured into about 50 mL of methanol to separate a copolymer, thereby obtaining 0.49 g of a dried copolymer.

So obtained copolymer contained an isopropylidene diallylmalonate unit in an amount of 3.4% by mol, and 1-hexene unit in an amount of 6.1% by mol, the total amount of all the monomer units being 100% by mol, and therefore, an ethylene unit in an amount of 90.5% by mol (100% by mol–3.4% by mol–6.1% by mol), and had a number-average molecular weight (Mn) of 21,000; a molecular weight distribution (Mw/Mn) of 2.4; and no endothermic peak at 149° C. or lower in a differential thermal analysis (DTA). Results are shown in Table 2.

Comparative Example 1

Example 14 was repeated except that isopropylidene diallylmalonate was changed to 0.06 g (0.7 mmol) of methyl acrylate.

There was obtained 0.047 g of a dried copolymer, which contained a methyl acrylate unit in an amount of 7% by mol, the total amount of all the monomer units being 100% by mol, and therefore, an ethylene unit in an amount of 93% by mol (100% by mol–7% by mol), and had a number-average molecular weight (Mn) of 1,500; a molecular weight distribution (Mw/Mn) of 1.6; an oily state at a room temperature. Results are shown in Table 2.

Comparative Example 2

Example 14 was repeated except that isopropylidene diallylmalonate was changed to 0.12 g (1.4 mmol) of methyl acrylate, thereby obtaining little copolymer. Results are shown in Table 2.

TABLE 1

| Example | Mn | Mw/Mn | Configuration between main chain and five-membered ring |
|---|---|---|---|
| 1 | 8,200 | 1.6 | Transform |
| 2 | 9,200 | 1.8 | Transform |
| 3 | 6,500 | 1.6 | Transform |
| 4 | 9,800 | 1.6 | Transform |
| 5 | 6,000 | 1.6 | Transform |
| 6 | 18,400 | 1.4 | Transform |
| 7 | 9,000 | 1.6 | Transform |
| 8 | 6,300 | 1.7 | Transform |
| 9 | 8,400 | 1.8 | Transform |
| 10 | 4,400 | 1.7 | Transform |

| Example | Stereoregularity | Glass-transition temp. |
|---|---|---|
| 1 | Threodisyndiotactic triad: 67% | not found |
| 2 | not found | not found |
| 3 | not found | not found |
| 4 | Threodisyndiotactic triad: 65% | not found |
| 5 | not found | not found |
| 6 | not found | not found |
| 7 | Threodisyndiotactic triad: 64% | not found |
| 8 | Threodisyndiotactic triad: 68% | not found |
| 9 | Threodiisotactic triad: 66% | not found |
| 10 | Threodiisotactic triad: 83% | not found |

TABLE 2

| Example | Content of monomer units (by mol) | Mn |
|---|---|---|
| 11 | Isopropylidene diallylmalonate unit: 25% Ethylene unit: 75% | 8,000 |
| 12 | Isopropylidene diallylmalonate unit: 52% Ethylene unit: 48% | 8,500 |
| 13 | Isopropylidene diallylmalonate unit: 39% Ethylene unit: 61% | 9,300 |
| 14 | Isopropylidene diallylmalonate unit: 12% Ethylene unit: 88% | 6,100 |
| 15 | Isopropylidene diallylmalonate unit: 7% Ethylene unit: 93% | 52,000 |
| 16 | Isopropylidene diallylmalonate unit: 45% 1-Hexene unit: 55% | 8,000 |
| 17 | Isopropylidene diallylmalonate unit: 3.4% 1-Hexene unit: 6.1% Ethylene unit: 90.5% | 21,000 |
| Comparative Example 1 | Methyl acrylate unit: 7% Ethylene unit: 93% | 1,500 |
| Comparative Example 2 | Little copolymer was obtained. | |

| Example | Mw/Mn | State of copolymer | Endothermic peak in DTA |
|---|---|---|---|
| 11 | 1.2 | Solid | no peak |
| 12 | 1.3 | Solid | no peak |
| 13 | 1.5 | Solid | no peak |
| 14 | 1.5 | Solid | no peak |
| 15 | 2.5 | Solid | no peak |
| 16 | 2.1 | Solid | no peak |
| 17 | 2.4 | — | no peak |

TABLE 2-continued

| | | | |
|---|---|---|---|
| Comparative Example 1 | 1.6 | Oily | — |
| Comparative Example 2 | | Little copolymer was obtained. | |

INDUSTRIAL APPLICABILITY

The polymer of the present invention can be used as a molded article such as an extrusion-molded article and an injection-molded article. An extrusion-molding method may be a method known in the art. Examples of the extrusion-molding method are (1) an inflation-molding method comprising the steps of (1-1) extruding a molten polymer from a circular die, thereby forming a film or sheet having a blown-up tube-like shape, and (1-2) winding the film or sheet, (2) a T-die molding method comprising the steps of (2-1) extruding a molten polymer from a linear die, thereby forming a film or sheet, and (2-2) winding the film or sheet, and (3) a calender-molding method.

The invention claimed is:

1. A homopolymer having a repeating unit represented by the following formula (2):

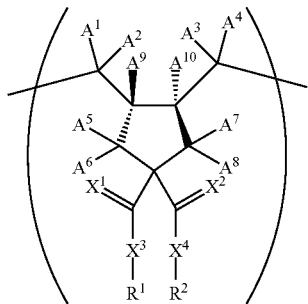

(2)

wherein $X^1$, $X^2$, $X^3$ and $X^4$ are independently of one another an atom belonging to group 16 of the periodic table; $R^1$ and $R^2$ are independently of each other a hydrogen atom or a hydrocarbyl group having 1 to 20 carbon atoms, and $R^1$ and $R^2$ may be linked with each other; and $A^1$, $A^2$, $A^3$, $A^4$, $A^5$, $A^6$, $A^7$, $A^8$, $A^9$ and $A^{10}$ are independently of one another a hydrogen atom, a halogen atom, an alkyl group, an aralkyl group, an aryl group, a substituent-having silyl group, an alkoxy group, an aralkyloxy group, an aryloxy group, a disubstituent-having amino group, or a hydrocarbylthio group.

2. The homopolymer according to claim 1, wherein the homopolymer is a diisotactic homopolymer having more than 25% of a threodiisotactic triad.

3. The homopolymer according to claim 1, wherein the homopolymer is a diisotactic homopolymer having more than 25% of an erythrodiisotactic triad.

4. The homopolymer according to claim 1, wherein the homopolymer is a disyndiotactic homopolymer having more than 25% of a threodisyndiotactic triad.

5. The homopolymer according to claim 1, wherein the homopolymer is a disyndiotactic homopolymer having more than 25% of an erythrodisyndiotactic triad.

6. A process for producing a homopolymer having a repeating unit represented by the following formula (2), which comprises the step of homopolymerizing a compound represented by the following formula (3):

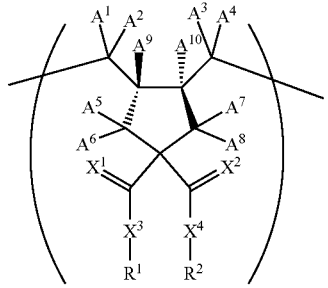

(2)

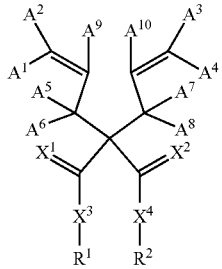

(3)

wherein $X^1$, $X^2$, $X^3$ and $X^4$ are independently of one another an atom belonging to group 16 of the periodic table; $R^1$ and $R^2$ are independently of each other a hydrogen atom or a hydrocarbyl group having 1 to 20 carbon atoms, and $R^1$ and $R^2$ may be linked with each other; and $A^1$, $A^2$, $A^3$, $A^4$, $A^5$, $A^6$, $A^7$, $A^8$, $A^9$ and $A^{10}$ are independently of one another a hydrogen atom, a halogen atom, an alkyl group, an aralkyl group, an aryl group, a substituent-having silyl group, an alkoxy group, an aralkyloxy group, an aryloxy group, a disubstituent-having amino group, or a hydrocarbylthio group.

7. The process for producing a homopolymer according to claim 6, wherein the homopolymerization is carried out in the presence of a polymerization catalyst formed by contacting a transition metal compound with an organic aluminum compound and/or boron compound.

8. The process for producing a homopolymer according to claim 7, wherein tie transition. metal compound is a compound represented by the following formula (I):

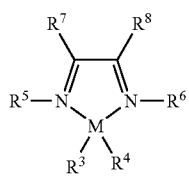

[I]

wherein M is a transition metal atom belonging to group 10 of the periodic table; $R^3$ and $R^4$ are independently of each other a hydrogen atom, a halogen atom, an alkyl group, an aralkyl group, an aryl group, a substituent-having silyl group, an alkoxy group, an aralkyloxy group or an aryloxy group; $R^5$ and $R^6$ are independently of each other a hydrocarbyl group having 1 to 30 carbon atoms; and $R^7$ and $R^8$ are independently of each other a hydrogen atom or a hydrocarbyl group having 1 to 20 carbon atoms, and $R^7$ and $R^8$ may be linked with each other.

9. The process for producing a homopolymer according to claim 7, wherein the transition metal compound is a compound represented by the following formula (II):

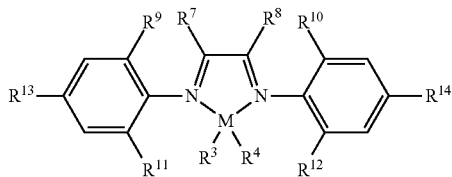

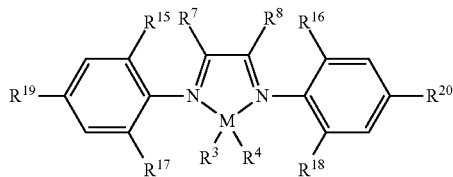

wherein M is a transition metal atom belonging to group 10 of the periodic table; $R^3$ and $R^4$ are independently of each other a hydrogen atom, a halogen atom, an alkyl group, an aralkyl group, an aryl group, a substituent-having silyl group, an alkoxy group, an aralkyloxy group or an aryloxy group; $R^7$ and $R^8$ independently of each other a hydrogen atom or a hydrocarbyl group having 1 to 20 carbon atoms, and $R^7$ and $R^8$ may be linked with each other; $R^9$ and $R^{10}$ independently of each other a hydrogen atom, a halogen atom, an alkyl group, an aralkyl group, a substituent-having silyl group an alkoxy group, an aralkyloxy group, a disubstituent-having amino group, or a hyrocarbylthio group; $R^{11}$ and $R^{12}$ are independently of each other an aryl group having 7 to 20; and $R^{13}$ and $R^{14}$ are independently of each other a hydrogen atom, a halogen atom, an alkyl group, an aralkyl group, an aryl group, a substituent-having silyl group, an alkoxy group, an aralkyloxy group, an aryloxy group, a disubstituent-having amino group, or a hyrocarbylthio group.

10. The process for producing a homopolymer according to claim 7, wherein the transition metal compound is a compound represented by the following formula (III);

wherein M is a transition metal atom belonging to group 10 of the periodic table; $R^3$ and $R^4$ are independently of each other a hydrogen atom, a halogen atom, an alkyl group, an aralkyl group, an aryl group, a substituent-having silyl group, an alkoxy group, an aralkyloxy group or an aryloxy group; $R^7$ and $R^8$ are independently of each other a hydrogen atom or a hydrocarbyl group having 1 to 20 carbon atoms, and $R^7$ and $R^8$ may he linked with each other; $R^{15}$, $R^{16}$, $R^{17}$ and $R^{18}$ are independently of each other a hydrogen atom, a halogen atom, an alkyl group, an aralkyl group, a phenyl group or a phenyl group having 1 to 5 halogen atoms, a substituent-having silyl group, an alkoxy group, an aralkyloxy group, an aryloxy group, a disubstituent-having amino group, or a hyrocarbylthio group; and $R^{19}$ and $R^{20}$ are independently of each other a hydrogen atom, a halogen atom, an alkyl group, an aralkyl group, an aryl group, a substituent-having silyl group, an alkoxy group, an aralkyloxy group, an aryloxy group, a disubstituent-having amino group, or a hyrocarbylthio group.

\* \* \* \* \*